(12) United States Patent
Prager

(10) Patent No.: US 11,447,371 B2
(45) Date of Patent: *Sep. 20, 2022

(54) PERFORATED CAPSULE HOOK FOR STABLE HIGH SPEED RETRACT

(71) Applicant: Wing Aviation LLC, Mountain View, CA (US)

(72) Inventor: Andre Prager, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/213,738

(22) Filed: Mar. 26, 2021

(65) Prior Publication Data

US 2021/0238014 A1 Aug. 5, 2021

Related U.S. Application Data

(63) Continuation of application No. 15/958,552, filed on Apr. 20, 2018, now Pat. No. 10,974,934.

(51) Int. Cl.
| | | |
|---|---|---|
| *B64C 1/22* | (2006.01) | |
| *B66C 1/22* | (2006.01) | |
| *B64D 1/22* | (2006.01) | |

(52) U.S. Cl.
CPC ............... *B66C 1/22* (2013.01); *B64D 1/22* (2013.01); *B64C 2201/128* (2013.01)

(58) Field of Classification Search
CPC ........ B66C 1/22; B64D 1/22; B64D 2201/128
See application file for complete search history.

(56) References Cited

U.S. PATENT DOCUMENTS

| | | | | |
|---|---|---|---|---|
| 3,016,257 A * | 1/1962 | White | ...................... | B64D 1/22 294/82.33 |
| 3,194,598 A * | 7/1965 | Goldfuss | ................... | B66C 1/36 294/82.19 |
| 6,336,260 B1 * | 1/2002 | Mauthner | ............... | F16B 45/02 24/376 |
| 2002/0175246 A1 * | 11/2002 | Kurtgis | ..................... | B64D 1/12 244/137.4 |
| 2016/0009393 A1 * | 1/2016 | Repp | ..................... | G06T 11/001 701/34.4 |
| 2016/0332843 A1 * | 11/2016 | Schafer | ..................... | B64D 1/22 |

* cited by examiner

*Primary Examiner* — Richard G Davis
(74) *Attorney, Agent, or Firm* — McDonnell Boehnen Hulbert & Berghoff LLP

(57) ABSTRACT

A payload coupling apparatus is provided that includes a housing having an upper portion, a lower portion, and a side wall positioned between the upper and lower portions, an attachment point on the housing adapted for attachment to a first end of a tether, a slot in the housing that extends downwardly towards a center of the housing thereby forming a hook or lip on the lower portion of the housing beneath the slot, a plurality of holes in the upper portion of the housing; and a plurality of holes in the lower portion of the housing. A method of retracting a payload coupling apparatus during UAV flight is also provided.

23 Claims, 20 Drawing Sheets

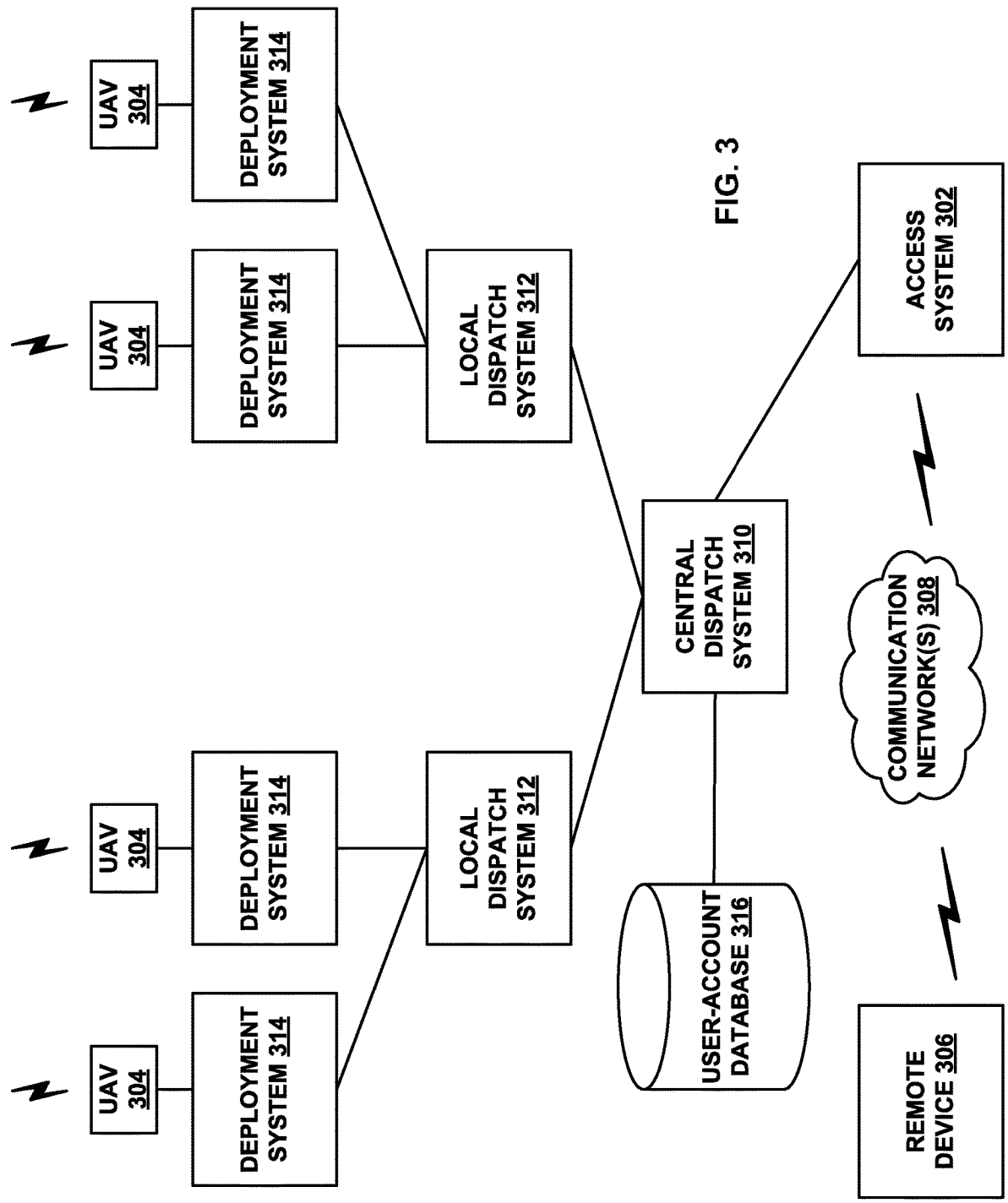

PERFORATED CAPSULE HOOK FOR STABLE HIGH SPEED RETRACT

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to deliver a payload to, or retrieve a payload from, an individual or business. A payload may be automatically retrieved by lowering a payload coupling apparatus and automatically retrieving the payload from a payload retrieval apparatus. For example, the payload may have a handle that may be secured to a payload coupling apparatus at the end of the winch, or a handle that may be secured within the UAV. During automatic retrieval, the payload coupling apparatus may have a hook or lip beneath a slot, the hook or lip or the payload coupling apparatus may be extended through an aperture in the handle of the payload to secure the payload to the payload coupling apparatus.

The payload coupling apparatus may provide for automated delivery of the payload as well. Upon arriving at a payload delivery site, the payload coupling apparatus and attached payload may be lowered by a winch within the UAV and the payload may land on the ground or payload receiving apparatus. Once the payload contacts the ground or payload receiving apparatus, the payload coupling apparatus may be further lowered by the winch and automatically disengage from the handle of the payload. Once the payload coupling apparatus is disengaged from the payload, the UAV may move into forward flight to another payload retrieval site or charging station, with the payload coupling apparatus suspended from the UAV at the end of the winch line. As the UAV moves forward, the payload coupling apparatus may be winched back towards the UAV. However, forward movement and retraction of the UAV may result in undesirable oscillations and instability in the payload coupling apparatus causing the payload coupling apparatus to move wildly where it may contact the UAV during flight. As a result, the speed at which the UAV may move forward during payload coupling apparatus retraction may need to be reduced.

Therefore, it would be desirable to provide a payload coupling apparatus that allows for stable retraction of the payload coupling apparatus through a wide range of air speeds, and at a full cruise speed of 25-35 m/s, or more.

SUMMARY

The present embodiments advantageously provide a payload coupling apparatus that has the same hook and lip construction as a smooth-walled payload coupling apparatus, but advantageously includes a series of perforations or holes in the major surfaces of the payload coupling apparatus which allow the payload coupling apparatus to remain stable even at increased air speeds of 25-35 m/s or more. The series of perforations or holes serve to stabilize the payload coupling apparatus so that it remains in a relatively stable state during high speed UAV flight of 25-35 m/s or more.

A series of holes or elongated holes (hereafter "holes") that are positioned on the major surfaces of the payload coupling apparatus. In particular, the payload coupling apparatus may have a hemispherically-shaped upper portion where a tether may be attached, or extend through for internal attachment, at a centrally located point. A series of holes are positioned on the hemispherically-shaped upper portion, which may have an equal spacing therebetween. A side wall of the payload coupling apparatus beneath the hemispherically-shaped upper surface may also be provided with holes, and cams on the side walls also may include holes therein.

Similarly, the hook or lip of the payload coupling apparatus has holes positioned therein that extend from the slot through the upper and lower surfaces of the hook or lip. In addition, an upper surface of the slot includes one or more holes therein that extend from the slot into an interior of the payload coupling apparatus.

The holes extend through outer surfaces of the payload coupling apparatus into a hollow interior of the payload coupling apparatus. As a result, air is allowed to flow through the payload coupling apparatus, i.e. through the holes on the hemispherically-shaped upper portion and through the holes in the upper and lower surfaces of the slot and hook or lip, during high speed flight which allows for the payload coupling apparatus to remain in a stable position during retraction as the UAV moves at full cruise speed of 25-35 m/s or more.

In one aspect, a payload coupling apparatus is provided that includes a housing having an upper portion, a lower portion, and a side wall positioned between the upper and lower portions, an attachment point on the housing adapted for attachment to a first end of a tether, a slot in the housing that extends downwardly towards a center of the housing thereby forming a hook or lip on the lower portion of the housing beneath the slot, a plurality of holes in the upper portion of the housing; and a plurality of holes in the lower portion of the housing.

In another aspect, a method of retracting a payload coupling apparatus to a UAV is provided including (i) providing the payload coupling apparatus with a housing having an upper portion and a lower portion, and a side wall positioned between the upper portion and the lower portion, the housing attached to a first end of a tether with a second end of the tether attached to the UAV, a slot in the housing that extends downwardly towards a center of the housing thereby forming a hook or lip on the lower portion of the housing beneath the slot, a plurality of holes in the upper portion of the housing, a plurality of holes in the side wall portion of the housing, and a plurality of holes positioned in the lower portion of the housing; (ii) moving the UAV forward at a rate of 25-35 m/s; (iii) retracting the payload coupling apparatus towards the UAV with the tether as the UAV moves forward at a rate of 25-35 m/s; and (iv) wherein the payload coupling apparatus remains stable during retraction of the payload coupling apparatus.

The present embodiments further provide a system for retracting a payload coupling apparatus with means for providing stable, non-erratic payload coupling apparatus retraction at UAV cruise speed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example.

DETAILED DESCRIPTION

Figure 1:
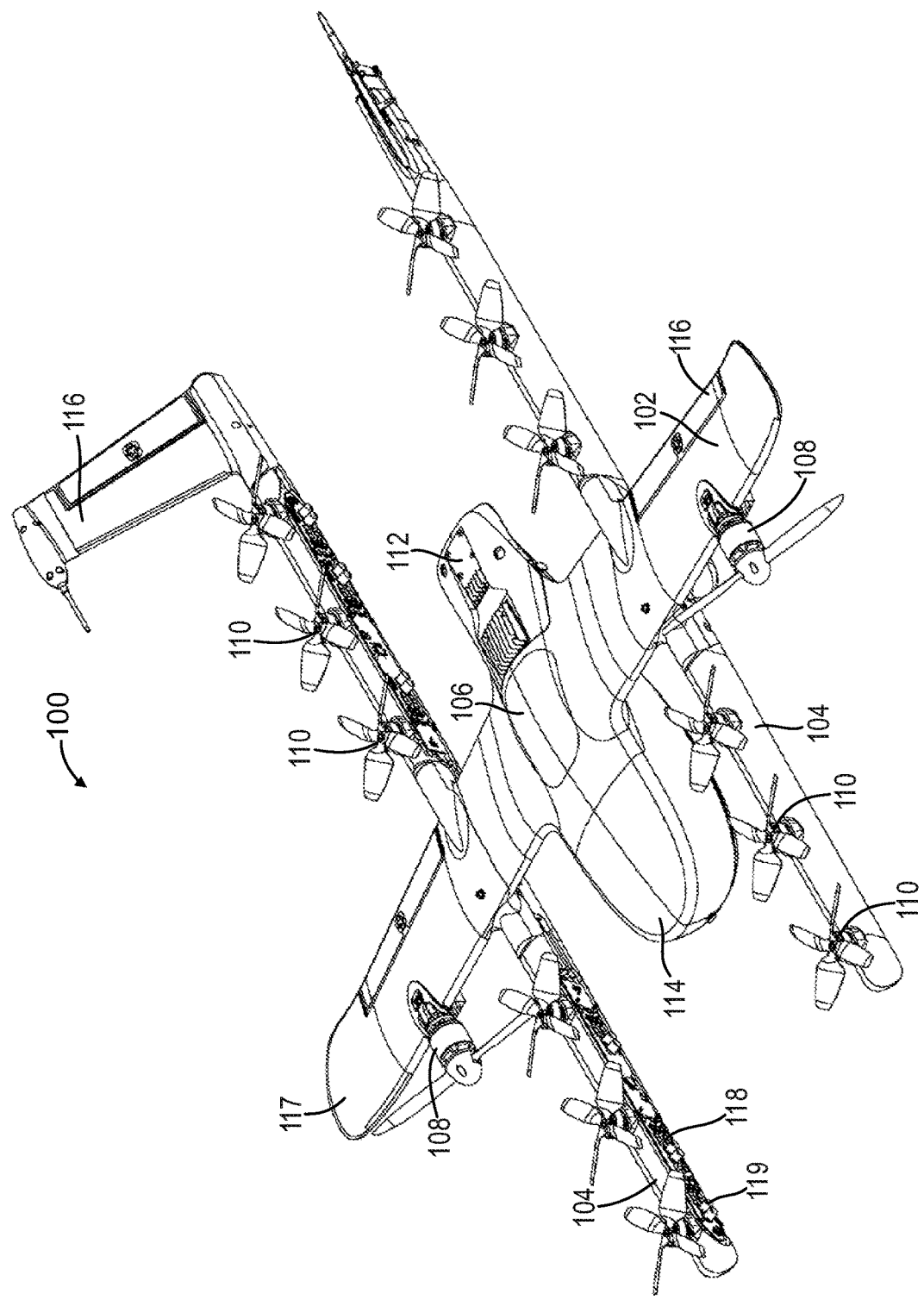
FIG. 1 is an isometric view of an example unmanned aerial vehicle 100, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

As noted above, the payload coupling apparatus may provide for automated delivery of the payload. Upon arriving at a payload delivery site, the payload coupling apparatus and attached payload may be lowered by a winch within the UAV and the payload may land on the ground or payload receiving apparatus. Once the payload contacts the ground or payload receiving apparatus, the payload coupling apparatus may be further lowered by the winch and automatically disengage from the handle of the payload. Once the payload coupling apparatus is disengaged from the payload, the UAV may move into forward flight to another payload retrieval site or charging station, with the payload coupling apparatus suspended from the UAV at the end of the winch line. As the UAV moves forward, the payload coupling apparatus may be winched back towards the UAV. In this manner, the UAV does not have to wait until the payload coupling apparatus has been winched back to the UAV before the UAV moves towards the next destination.

Following payload delivery, the payload coupling apparatus is subject to oscillations, and may begin to swing from side to side. In order to dampen the oscillations, the UAV moves into a forward flight where airflow serves to reduce oscillations of the payload coupling apparatus. When using a solid, smooth-walled payload coupling apparatus, forward movement of the UAV at air speeds of around 20 meters per second (m/s) may be effective to dampen the oscillations of the payload coupling apparatus. However, if the air speed is too low, less than 19 m/s, then the dampening effect on the oscillations of the payload might not be sufficient. In addition, at speeds above 22 m/s, the payload coupling apparatus becomes unstable with the increased airflow and bounces around wildly and may strike the UAV, and there is the possibility of engagement with the rotors of the UAV.

Therefore, when using a solid, smooth-walled payload coupling apparatus, a range of air speeds from 19-22 m/s is suitable to dampen the oscillations of the payload coupling apparatus. Air speeds in the range of 19-22 m/s, depending on the UAV, may be too slow for the UAV to be "on the wing" in full forward flight requiring that the hover motors of the UAV are still running, which increases energy consumption and reduces the range of the UAV.

The present embodiments are directed to a payload coupling apparatus that has the same hook and lip construction as a standard smooth-walled payload coupling apparatus, but advantageously includes a series of perforations, or holes, in the major surfaces of the payload coupling apparatus which allow the payload coupling apparatus to remain stable even at increased air speeds of 25-35 m/s or more. The series of perforations or holes serve to stabilize the payload coupling apparatus during retraction so that it remains in a calm, non-erratic state during high speed UAV flight of 25-35 m/s or more.

The perforations may include a series of holes that are symmetrically positioned on the major surfaces of the payload coupling apparatus. The holes also may not be symmetrically positioned, but may be positioned to provide aerodynamic symmetry in such a manner that the holes "act" symmetrically. The holes also may be positioned in a non-symmetrical fashion, although holes positioned to provide aerodynamic symmetry are preferred. In particular, the payload coupling apparatus may have a hemispherically-shaped upper portion with a centrally located tether attachment point, or hole through which the tether may extend for internal attachment, that may be used to secure the payload coupling apparatus to a tether that is attached to a UAV. A series of holes are symmetrically positioned on the hemispherically-shaped upper portion, which may have an equal spacing therebetween. If the holes are not positioned symmetrically or in a manner to provide aerodynamic symmetry, an undesirable oscillatory up and down motion may result during flight. A side wall of the payload coupling apparatus beneath the hemispherically-shaped upper portion may also be provided having holes, and cams on the side wall also may include holes therein.

Similarly, the hook or lip of the payload coupling apparatus may have holes positioned therein that extend from the slot through the upper surface of the hook or lip, as well as holes positioned in the lower surface of the hook or lip. In addition, an upper surface of the slot may include one or more holes that extend from the slot into an interior of the payload coupling apparatus.

The holes extend through outer surfaces of the payload coupling apparatus into a hollow interior of the payload coupling apparatus. As a result, air is allowed to flow through the payload coupling apparatus, i.e. through the holes on the hemispherically-shaped upper surface and through the holes in the upper and lower surfaces of the slot and hook or lip, during high speed flight which allows for the payload coupling apparatus to remain in a stable position during retraction as the UAV moves at full cruise speed of 25-35 m/s or more.

In addition, a weighted disc may be positioned within the payload coupling apparatus to provide a "weight-forward" payload coupling apparatus which contributes to increased high speed stability. Due to less material used for the payload coupling apparatus because of the holes, the disc may add weight to the payload coupling apparatus so that a desired overall weight may be achieved.

Furthermore, the weighted disc may have a centrally located aperture, or a plurality of holes, that provides an aerodynamic influence on the payload coupling apparatus. The size of the centrally located aperture of plurality of holes in the weighted disc may be adjusted so that the payload coupling apparatus rides higher or lower in the air column during retraction as the UAV moves at full cruise speed. It is desirable for the payload coupling apparatus to ride as low as possible in the air column so that it is further away from the UAV during flight, thereby further reducing the chance of the payload coupling apparatus coming into contact with the UAV during flight.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1 is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
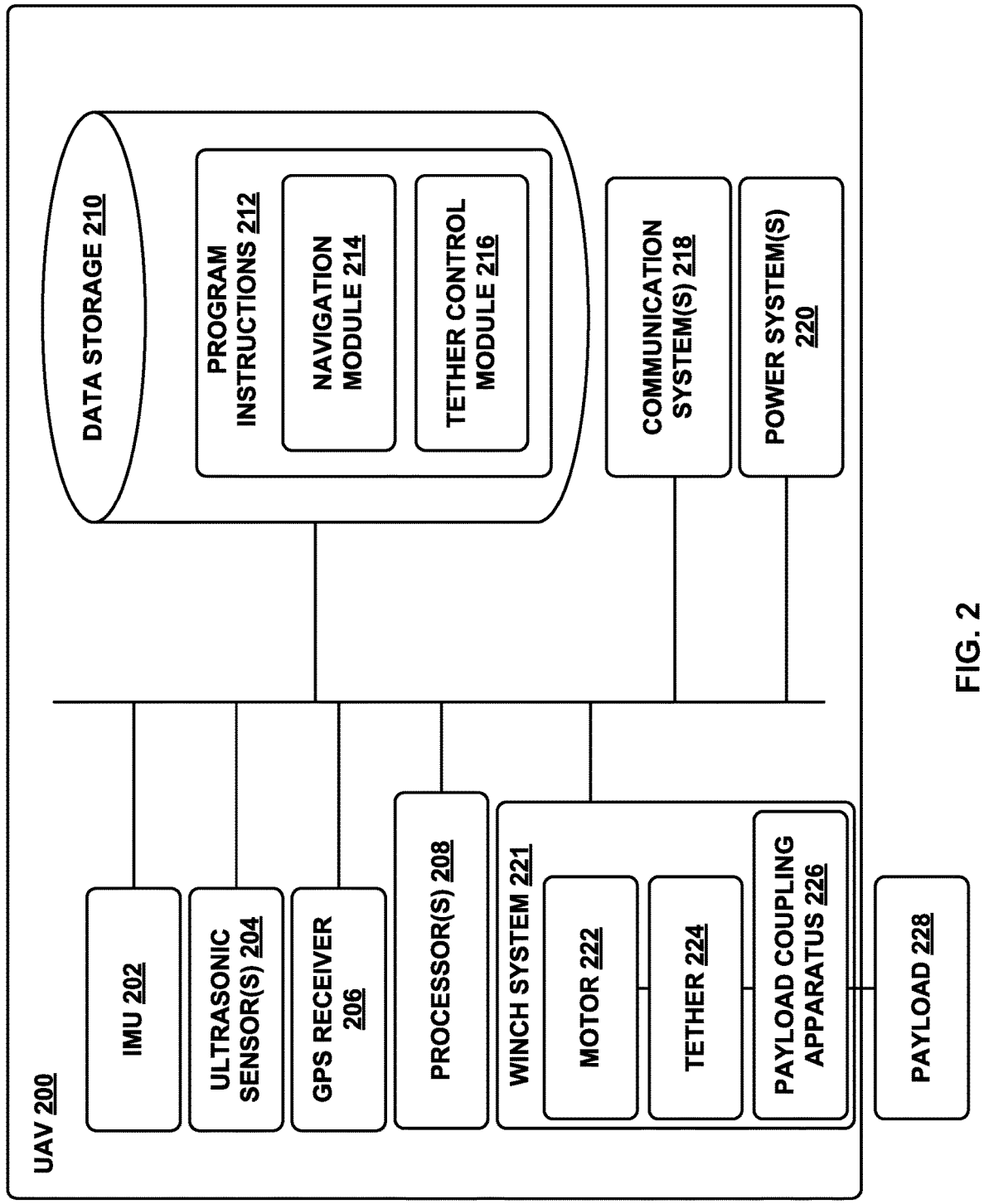
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Payload Coupling Apparatuses for Payload Retrieval and Delivery

FIGS. 4A-F show various perspective views of payload coupling apparatus 800, according to an example embodiment. Payload coupling apparatus 800 includes an upper portion 805 having a left side 805*a* and a right side 805*b*. Upper portion 805 is shown as having a hemispherical shape, although other shapes and configurations, such as a cone-shape, are possible as well. Payload coupling apparatus 800 also includes a slot 808 to position a handle of a payload handle in. Lower lip, or hook, 806 is positioned beneath slot 808, with lip or hook 806 having a left side 806*a* and a right side 806*b*. Slot 808 and lip or hook 806 are shown in a particular configuration, although payload coupling apparatus 800 may be provided with a slot of any suitable geometry or configuration, and a hook or lip of any suitable geometry or configuration suitable for the positioning of a handle of a payload within the slot above the hook or lip.

Payload coupling apparatus 800 further includes a side wall 810 having a left side 810*a* and right side 810*b*. Also included is an outer protrusion 844 having helical cam surfaces 804*a* and 804*b* that are adapted to mate with corresponding cam mating surfaces within a payload coupling apparatus receptacle 516 positioned with a fuselage of a UAV (as shown in FIG. 8E), to properly align payload coupling apparatus 800 within the payload coupling apparatus receptacle 516.

Upper portion 805 includes a plurality of holes (described in more detail below) that extend from an exterior thereof into an interior of the payload coupling apparatus 800. Holes on the left side 805*a* are shown to be symmetrical in size and position with holes on the right side 805*b* of upper portion 805. Similarly, side wall 810 includes a plurality of holes with holes on the left side 810*a* symmetrical in size and position with holes on the right side 810*b* of side wall 810.

Lower lip or hook 806 includes hole 860 on left side 806*a* symmetrical in size and position with hole 864 on right side 806*b*, and hole 861 on left side 806*a* symmetrical in size and position with hole 863 on right side 806*b*. Although not visible in FIGS. 4A-F, hook or lip 806 further includes one or more holes an upper surface thereof. In addition, upper surface 820 of slot 808 includes a hole 822 that extends in symmetrical fashion from the left side to the right side of upper surface 820. Upper surface 820 further includes hole 824 that extends in symmetrical fashion from the left side to the right side of upper surface 820. In addition, hole 884 is positioned above cam surface 804*b* that is symmetrical in size and position with hole 885 positioned above cam surface 804*a*.

Figure 4A:
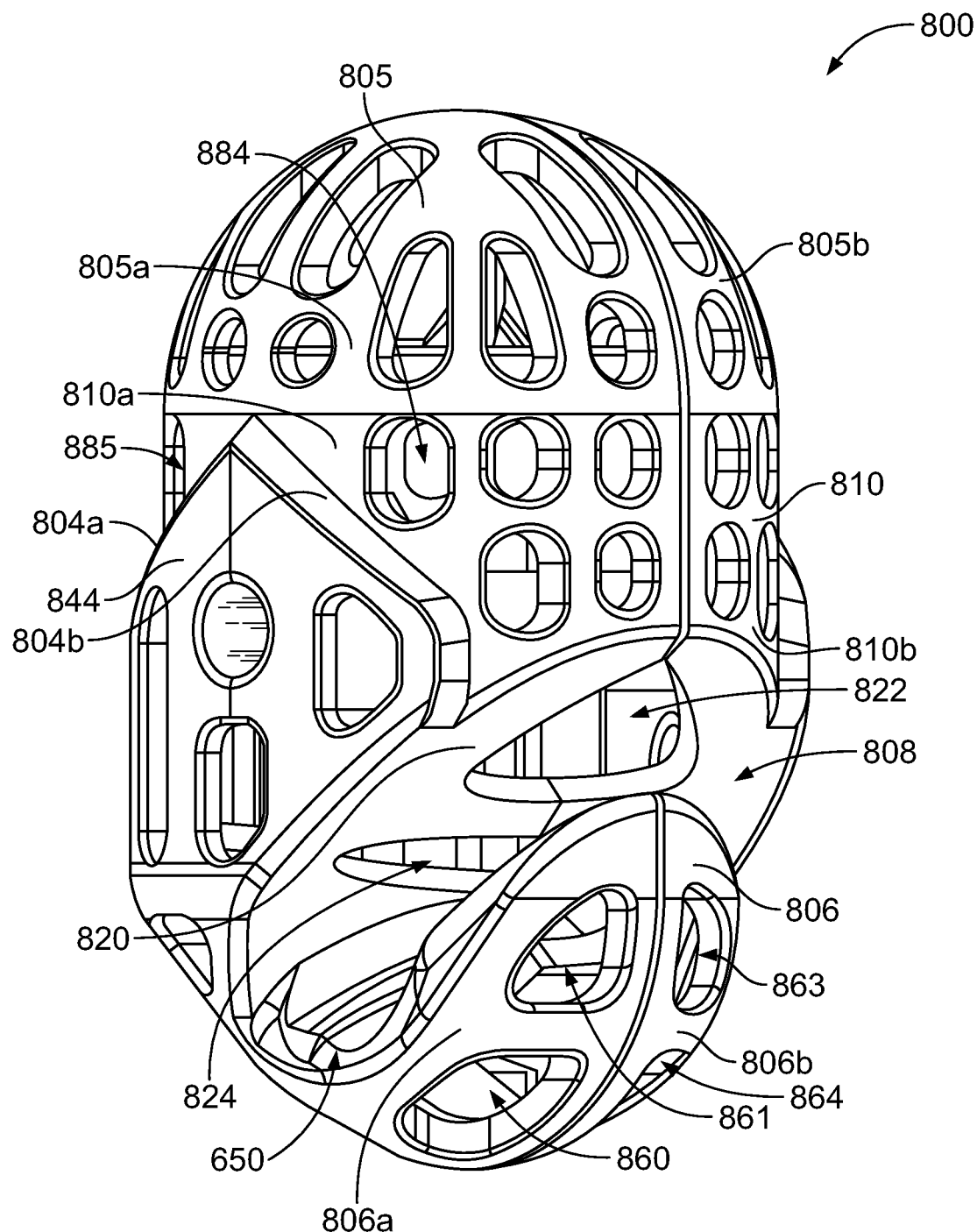
FIG. 4A is a perspective front left side view of payload coupling apparatus 800, according to an example embodiment.
Figure 4C:
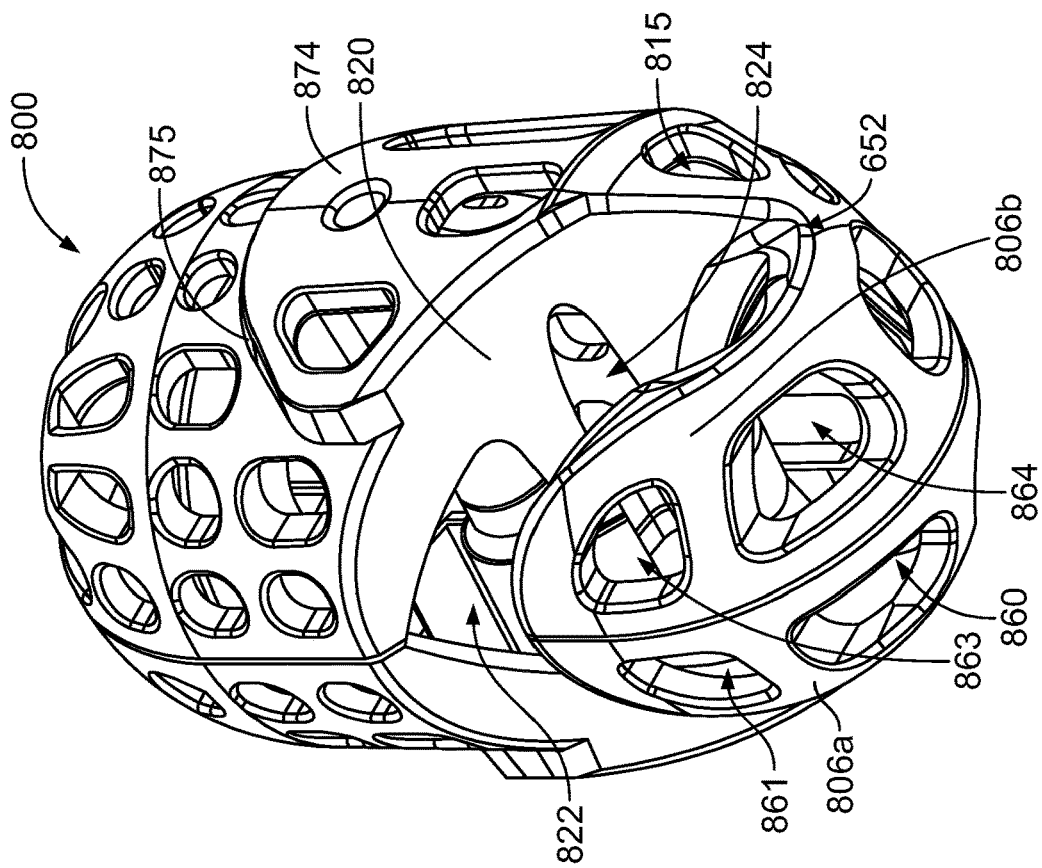
FIG. 4C is another perspective front right side view of payload coupling apparatus 800 shown in FIGS. 4A and 4B.
Figure 4B:
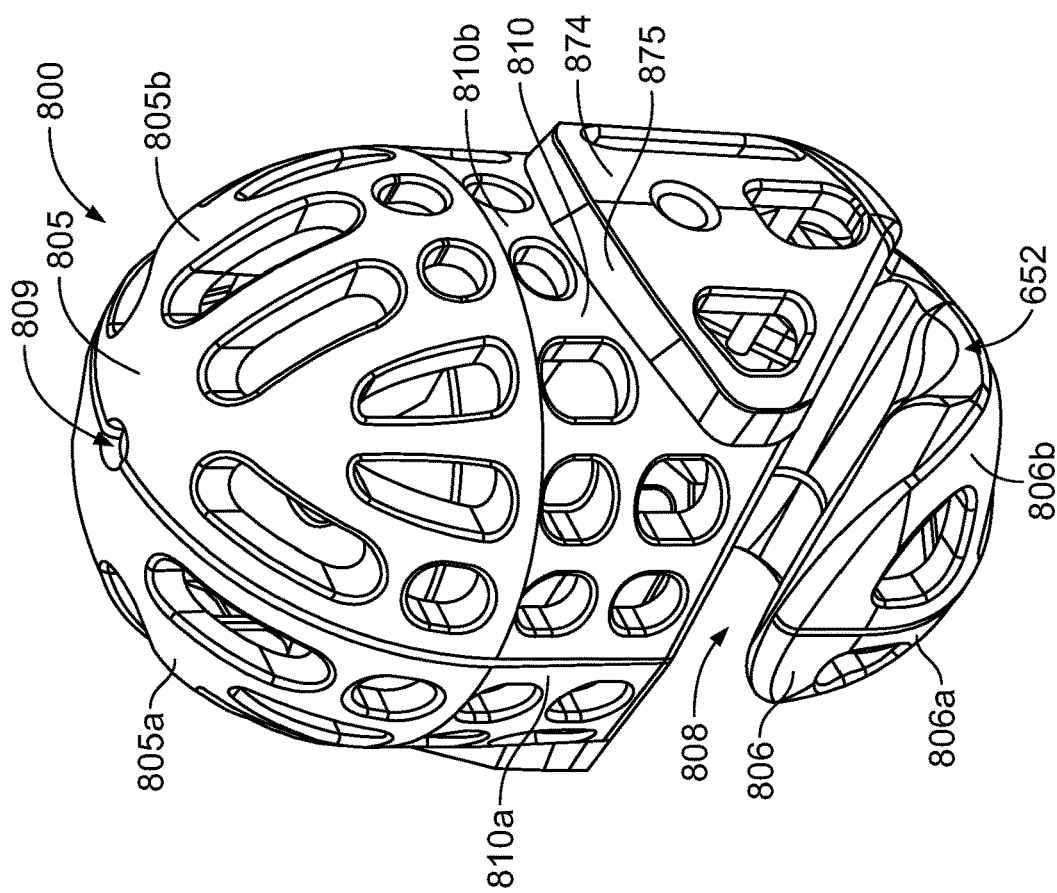
FIG. 4B is a perspective front right side view of payload coupling apparatus 800 shown in FIG. 4A.
Figure 8A:
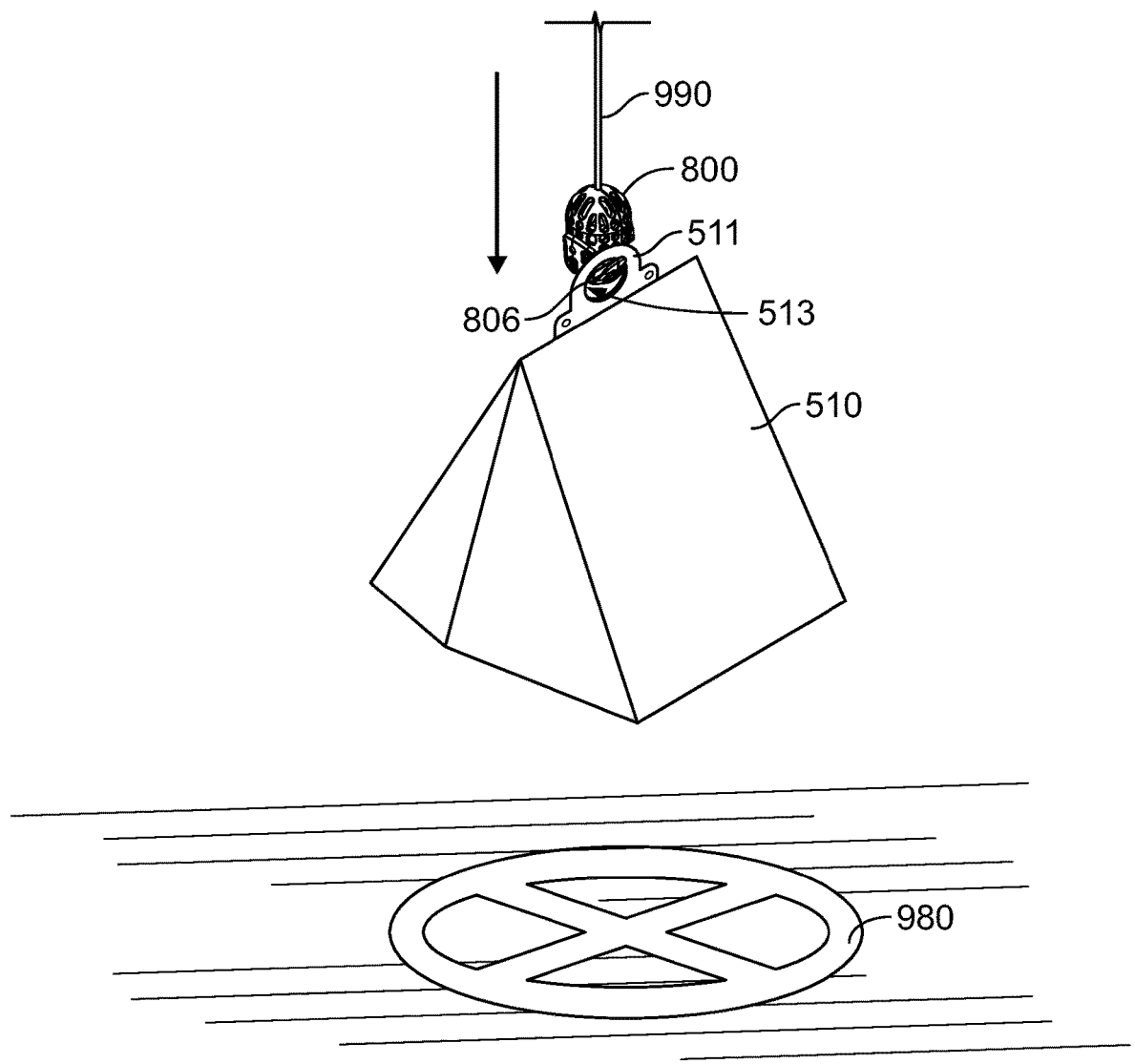
FIG. 8A is a perspective view of payload 510 and payload coupling apparatus 800 shown suspended by tether 990 from a UAV, above payload landing site 980, according to an example embodiment.
Figure 8B:
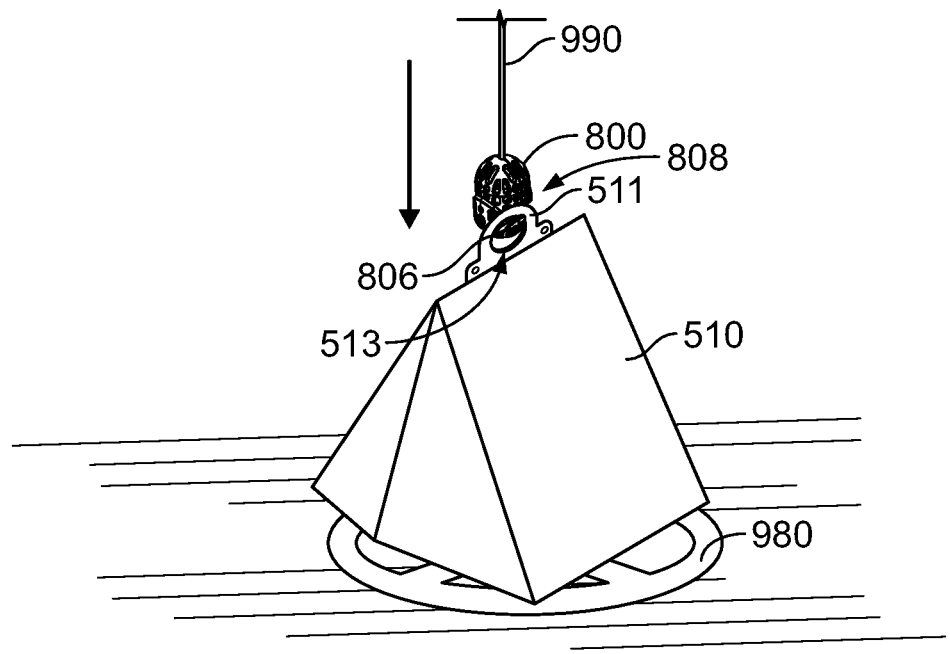
FIG. 8B is a perspective view of payload 510 and payload coupling apparatus 800 being lowered by a UAV onto payload landing site 980.
Figure 8C:
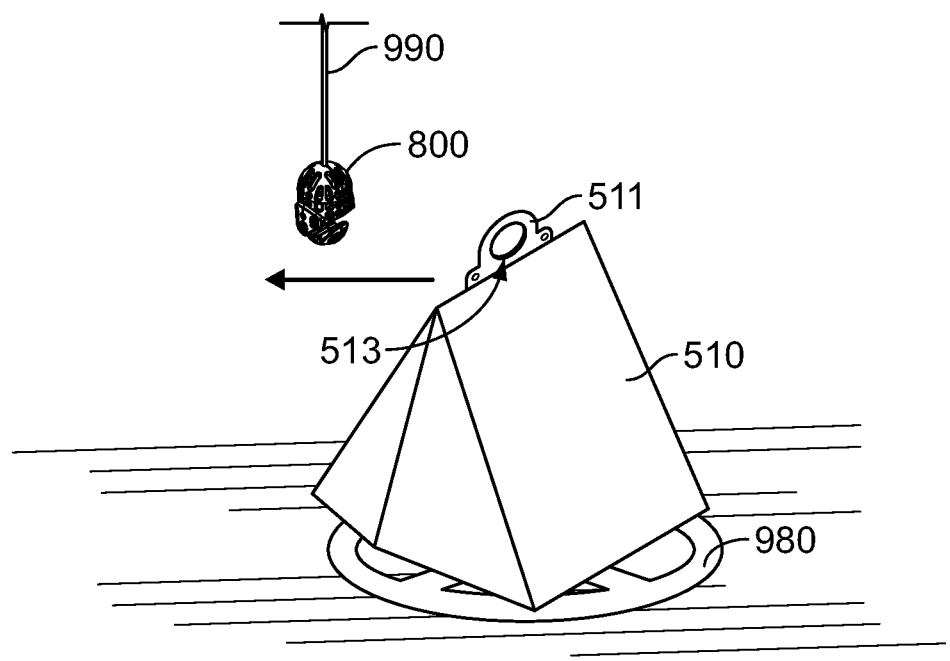
FIG. 8C is a perspective view of payload 510 positioned on payload landing site 980 after payload coupling apparatus 800 has been lowered and moved out of engagement with handle 511 of payload 510.
Figure 8D:
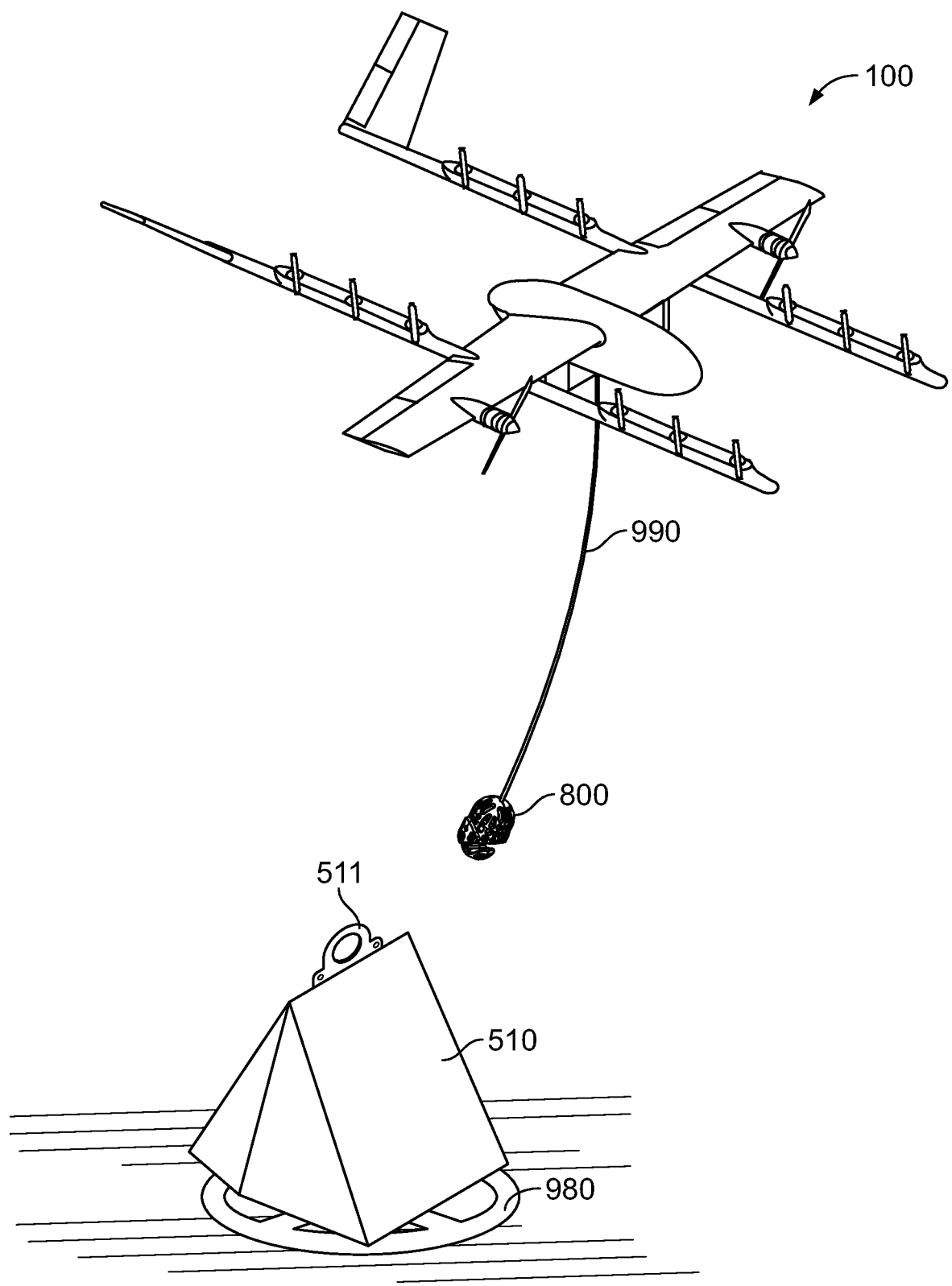
FIG. 8D is a perspective view of payload coupling apparatus 800 being retracted to UAV 100 after delivery of payload 510.
Figure 8E:
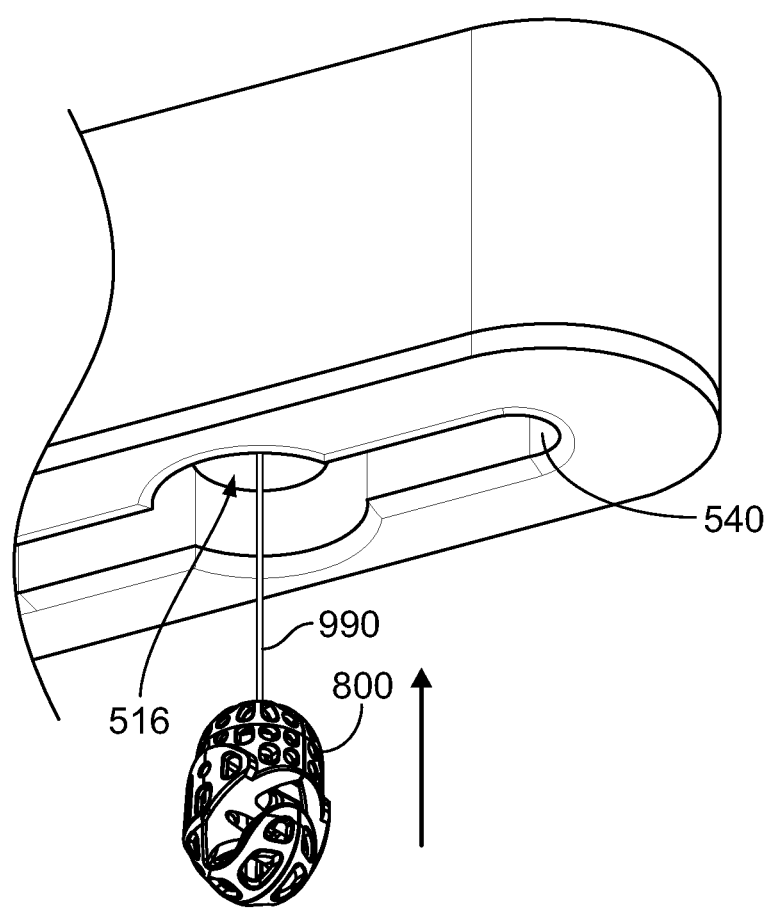
FIG. 8E is a perspective view of payload coupling apparatus 800 being retracted towards payload coupling apparatus receptacle 516, according to an example embodiment.

As shown in FIGS. 4B and 4C, right side 810*b* of side wall 810 includes a an outer protrusion 874 having a cam surface 875 that is adapted to mate with corresponding cam mating surfaces within a payload coupling apparatus receptacle 516 positioned with a fuselage of a UAV (as shown in FIG. 8E), to properly align payload coupling apparatus 800 within the payload coupling apparatus receptacle 516.

Figure 4E:
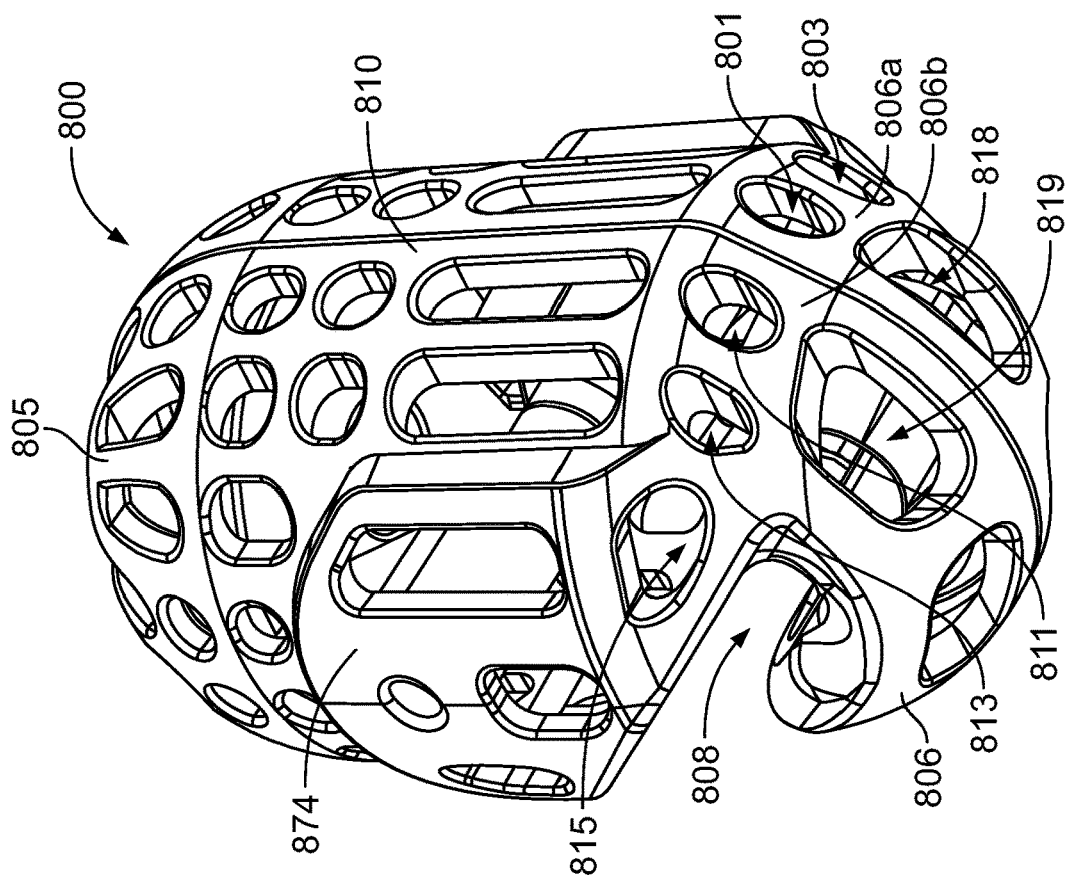
FIG. 4E is another perspective rear left side view of payload coupling apparatus 800 shown in FIGS. 4A-D.
Figure 4D:
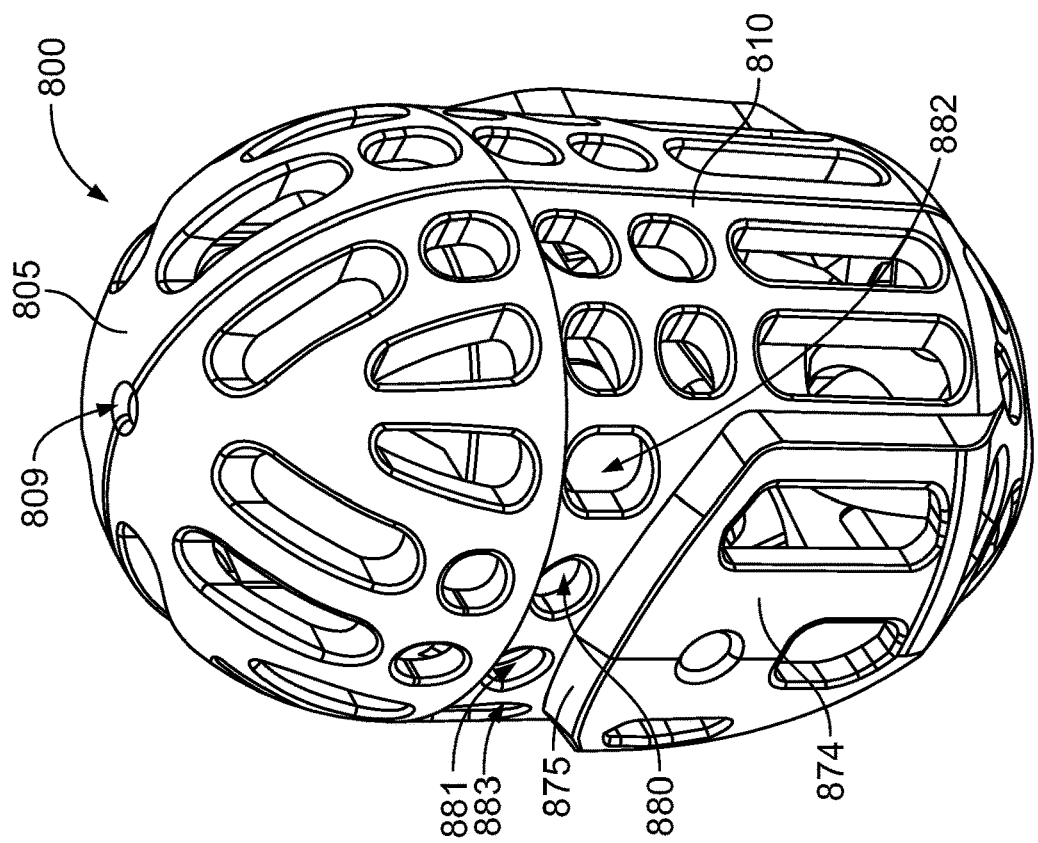
FIG. 4D is a perspective rear left side view of payload coupling apparatus 800 shown in FIGS. 4A-C.

As shown in FIGS. 4B and 4D, upper portion 805 includes an opening 809 through which an end of a tether may extend through for connection within upper portion 805, or any other location within payload coupling apparatus 800. Alternately, an end of a tether could be simply attached to the point where opening 809 is positioned. Also shown in FIG. 4D are a pair of symmetrical holes 880 and 881 positioned on side wall 810 above cam surface 875 of outer protrusion 874. Also shown, are symmetrical holes 882 and 883 positioned next to holes 880 and 881.

As shown in FIG. 4E, the rear side of lower portion of payload coupling apparatus 800 includes a hole 818 on the left side 806*a* symmetrical in size and position with hole 819 on right side 806*b*. Similarly, the rear side of lower portion of payload coupling apparatus 800 includes a hole 801 on left side 806*a* symmetrical in size and position with hole 811 on right side 806*b*, and also includes hole 803 on left side 806*a* symmetrical in size and position with hole 813 on right side 806*b*.

Figure 4F:
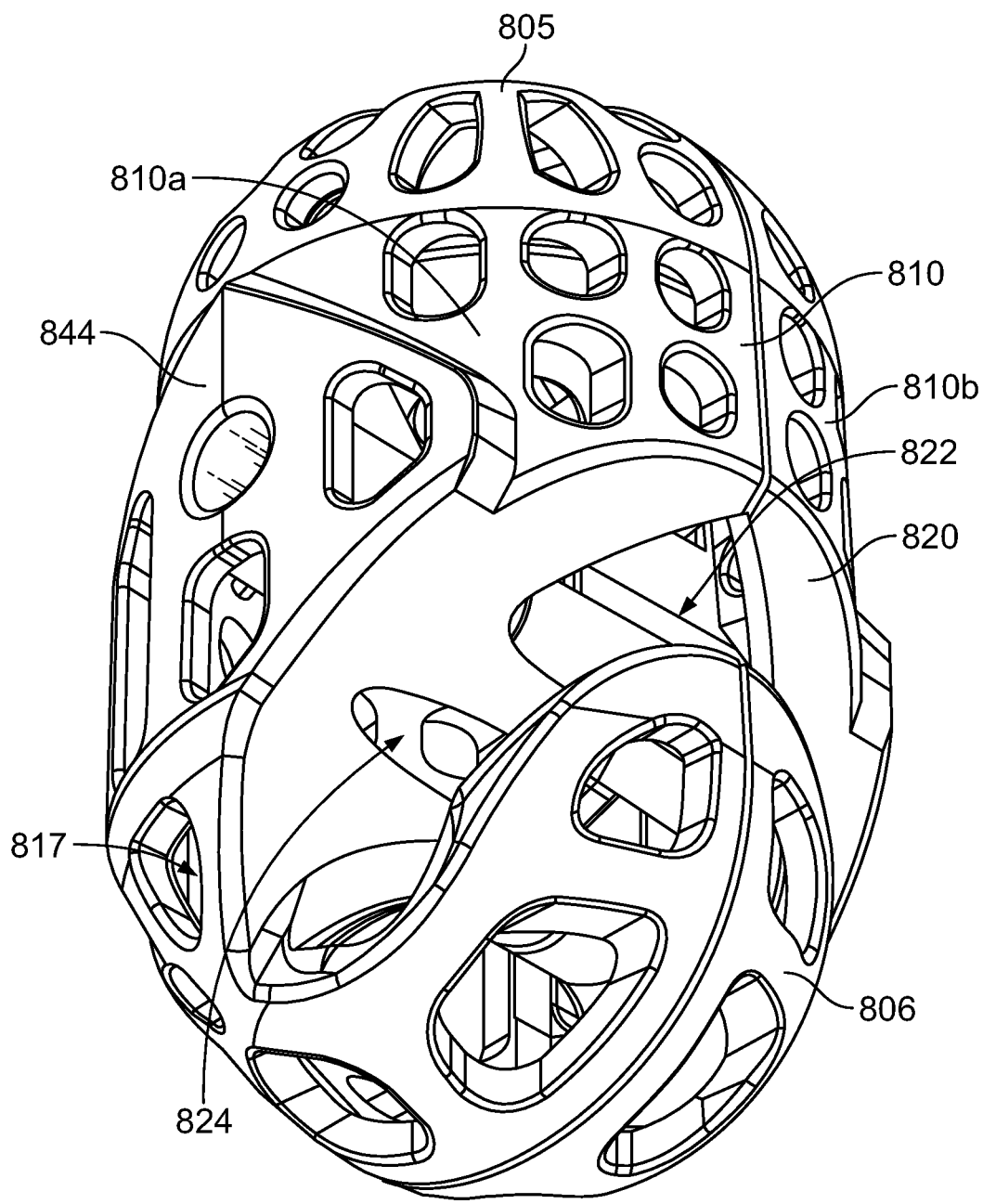
FIG. 4F is another perspective front left side view of payload coupling apparatus 800 shown in FIGS. 4A-E.

As shown in FIG. 4E, a hole 815 is shown positioned beneath outer protrusion 874 that is symmetrical in size and position with hole 817 positioned beneath outer protrusion 844 (shown in FIG. 4F).

Figure 5B:
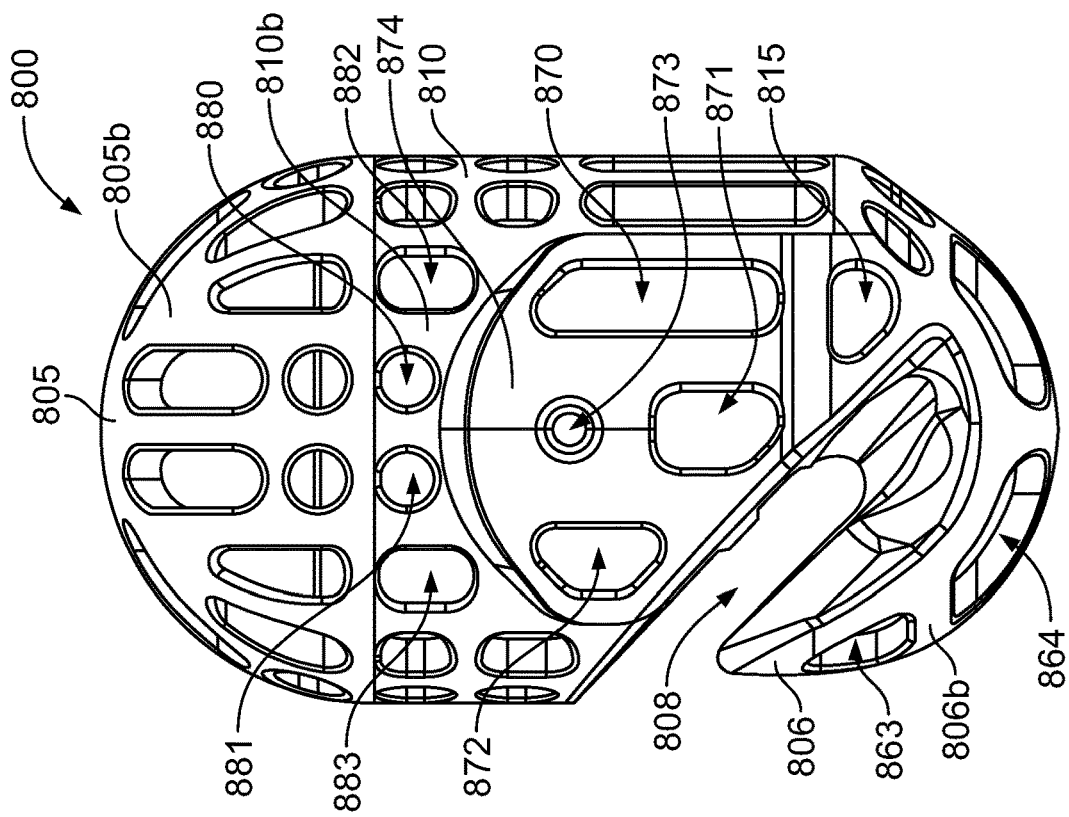
FIG. 5B is a right side view of payload retriever 800 shown in FIG. 5A.
Figure 5A:
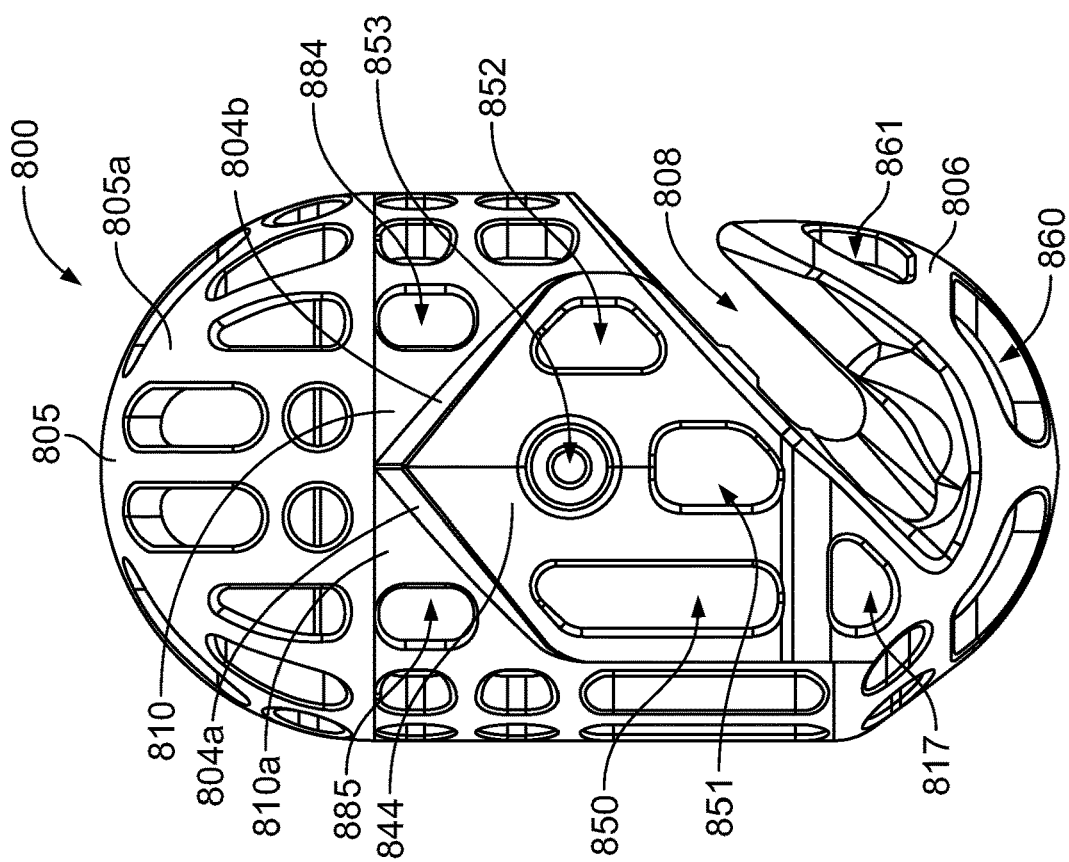
FIG. 5A is a left side view of payload coupling apparatus 800, according to an example embodiment.
Figure 7:
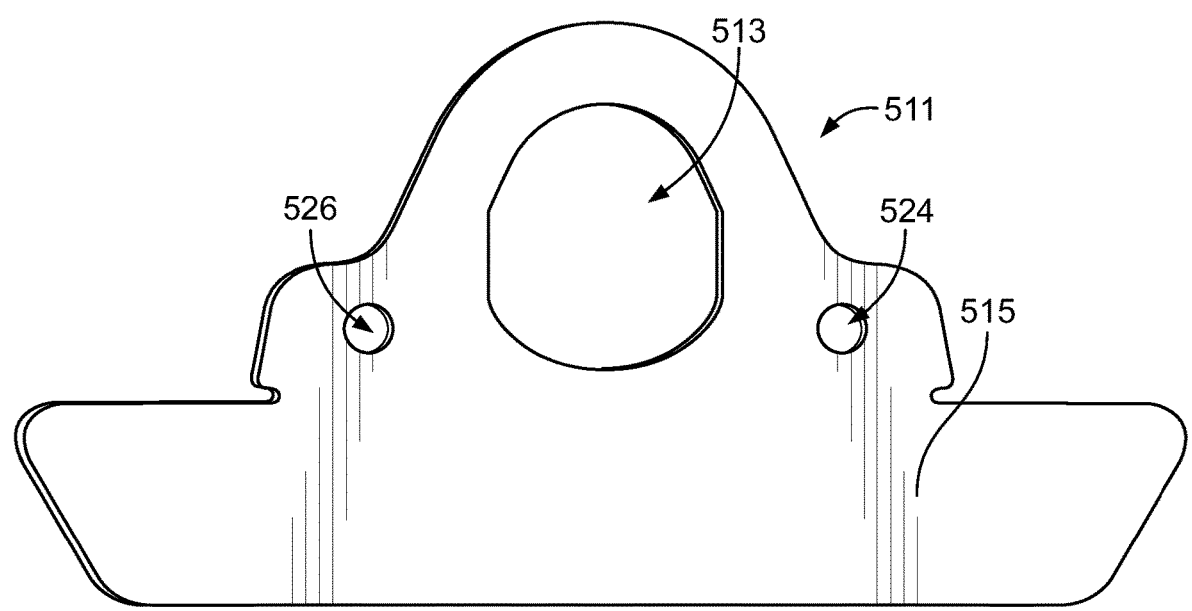
FIG. 7 is a side view of payload handle 511, according to an example embodiment.

FIGS. 5A-F show side views, front and rear views, and top and bottom views of payload coupling apparatus 800 shown in FIGS. 4A-F. FIG. 5A is a left side view of payload coupling apparatus 800. Payload coupling apparatus 800 includes an upper portion 805 having left side 805*a* with a plurality of holes therein (described in more detail below). Payload coupling apparatus 800 also includes a slot 808 to position a handle of a payload handle in. Lower lip, or hook, 806 is positioned beneath slot 808, with lip or hook 806 with left side 806*a* shown. Slot 808 is downwardly angled such that a handle 511 of a payload 510 may be positioned within the 808 slot with hook or lip 806 of the payload coupling apparatus 800 extending through an aperture 513 of handle 511 during payload pickup and delivery, as illustrated in FIGS. 7, 8A, and 8B.

Payload coupling apparatus 800 further includes a side wall 810 with left side 810a shown. Also included is an outer protrusion 844 having helical cam surfaces 804a and 804b that are adapted to mate with corresponding cam mating surfaces within a payload coupling apparatus receptacle 516 positioned with a fuselage of a UAV (as shown in FIG. 8E), to properly align payload coupling apparatus 800 within the payload coupling apparatus receptacle 516. Hole 884 is positioned above cam surface 804b that is symmetrical in size and position with hole 885 positioned above cam surface 804a.

Outer protrusion 844 includes hole 850 that is symmetrical in size and position with hole 870 positioned in outer protrusion 874 (shown in FIG. 5B). Outer protrusion 844 also includes hole 851 that is symmetrical in size and position with hole 871 positioned in outer protrusion 874, and further includes hole 852 that is symmetrical in size and position with hole 872 positioned in outer protrusion 874 (shown in FIG. 5B). Furthermore, outer protrusion 874 also includes hole 853 that is symmetrical in position with hole 873 positioned on outer protrusion 874 (shown in FIG. 5B). Moreover, hole 817 is positioned beneath outer protrusion 844 that is symmetrical in size and position with hole 815 positioned beneath outer protrusion 874 (shown in FIG. 5B).

FIG. 5B is a right side view of payload coupling apparatus 800. In FIG. 5B, a pair of symmetrical holes 880 and 881 are positioned on right side 810b of side wall 810 above cam surface 875 of outer protrusion 874. Also shown are symmetrical holes 882 and 883 positioned next to holes 880 and 881.

Figure 5C:
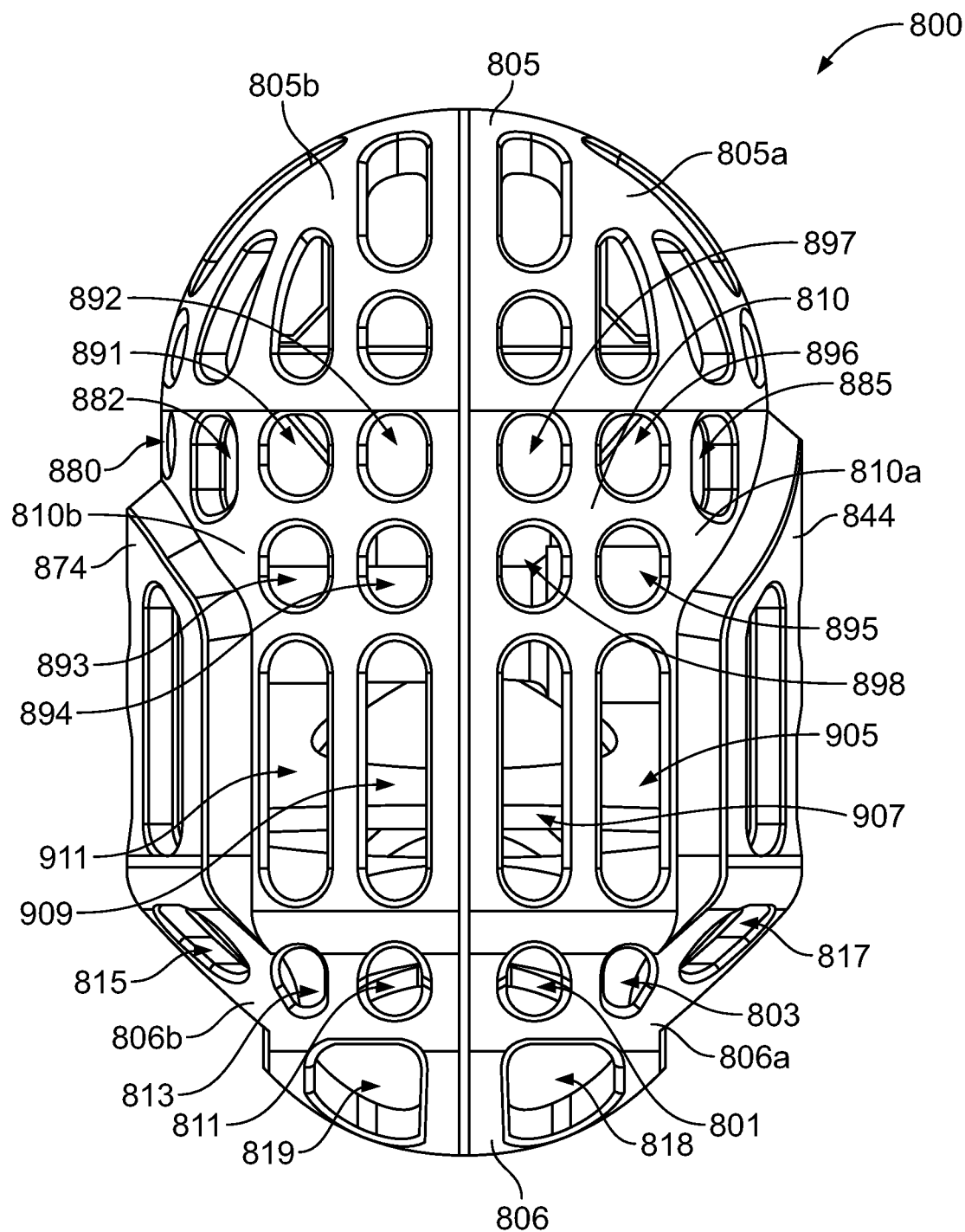
FIG. 5C is a rear view of payload retriever 800 shown in FIGS. 5A and 5B.

FIG. 5C is a rear view of payload coupling apparatus 800. Left side 810a of side wall 810 includes hole 885 that is symmetrical in size and position with hole 882 on right side 810b. Left side 810a of side wall 810 includes hole 896 that is symmetrical in size and position with hole 882 on right side 810b. Left side 810a of side wall 810 includes hole 896 that is symmetrical in size and position with hole 891 on right side 810b. Left side 810a of side wall 810 includes hole 897 that is symmetrical in size and position with hole 892 on right side 810b.

In addition, left side 810a of side wall 810 includes hole 895 that is symmetrical in size and position with hole 893 on right side 810b. Left side 810a of side wall 810 includes hole 898 that is symmetrical in size and position with hole 894 on right side 810b. Left side 810a of side wall 810 includes hole 905 that is symmetrical in size and position with hole 911 on right side 810b. Left side 810a of side wall 810 includes hole 907 that is symmetrical in size and position with hole 909. On right side 810b.

The rear side of hook or lip 806 includes left side 806a with hole 803 that is symmetrical in size and position with hole 813 on right side 806b. Left side 806a includes hole 801 that is symmetrical in size and position with hole 811 on right side 806b. In addition, left side 806a includes hole 818 that is symmetrical in size and position with hole 819 on right side 806a. Also shown, is hole 817 positioned beneath outer protrusion 844 that is symmetrical in size and position with hole 815 positioned beneath outer protrusion 874.

Figure 5D:
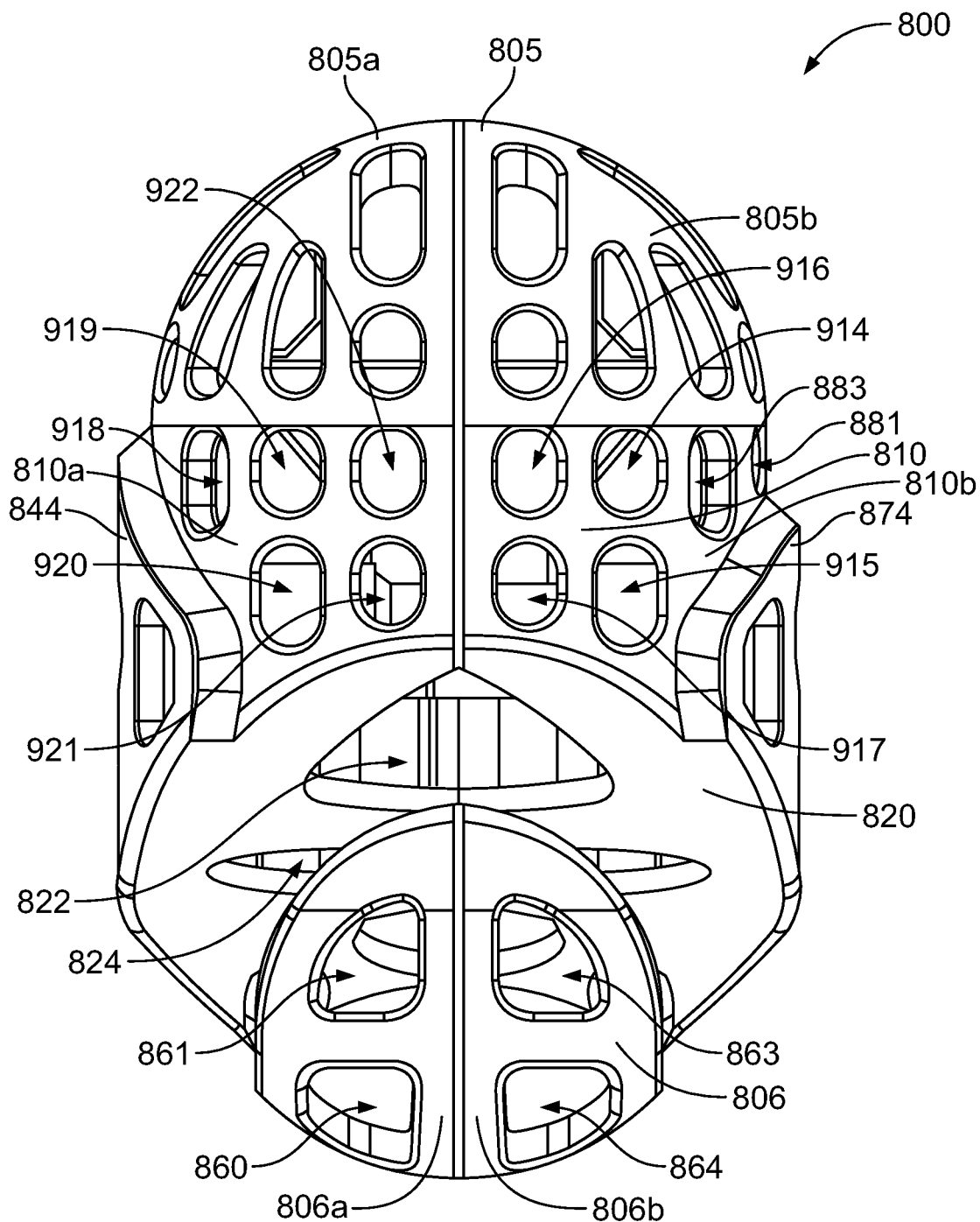
FIG. 5D is a front view of payload retriever 800 shown in FIGS. 5A-C.

FIG. 5D is a front view of payload coupling apparatus 800. Hole 918 is positioned above outer protrusion 844 on left side 810a of side wall 810 which is symmetrical in size and position with hole 883 positioned above outer protrusion 874 on the right side 810b of side wall 810. Left side 810a of side wall 810 includes hole 919 that is symmetrical in size and position with hole 914 on right side 810b. Left side 810a of side wall 810 includes hole 922 that is symmetrical in size and position with hole 916 on right side 810b. Left side 810a of side wall 810 includes hole 920 that is symmetrical in size and position with hole 915 on right side 810b. Left side 810a of side wall 810 includes hole 921 that is symmetrical in size and position with hole 917 on right side 810b.

Lower lip or hook 806 includes hole 860 on left side 806a symmetrical in size and position with hole 864 on right side 806b, and hole 861 on left side 806a symmetrical in size and position with hole 863 on right side 806b. Hook or lip 806 further includes hole 985 on an upper surface thereof (shown in FIG. 6A). In addition, upper surface 820 of slot 808 includes a hole 822 that extends in symmetrical fashion from the left side to the right side of upper surface 820. Upper surface 820 further includes hole 824 that extends in symmetrical fashion from the left side to the right side of upper surface 820.

Figure 5E:
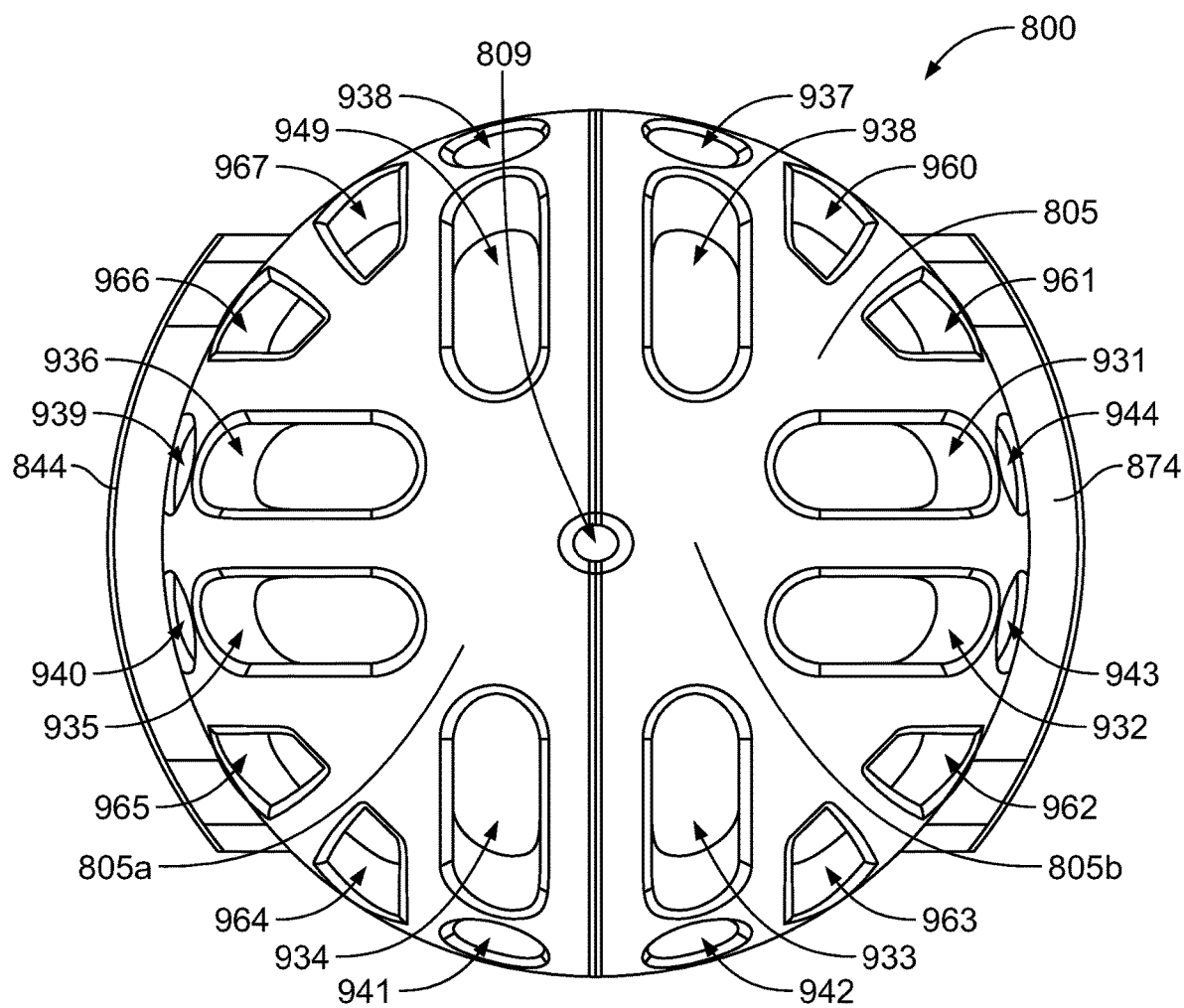
FIG. 5E is a bottom view of payload retriever 800 shown in FIGS. 5A-D.

FIG. 5E is a top view of payload coupling apparatus 800. Hole 809 is centrally located on the top of upper portion 805, and an end of a tether may extend therethrough and be attached on the inside of payload coupling apparatus 800. Left side 805a of upper portion 805 includes a pair of spaced holes 935 and 936 that are symmetrical in size and position with pair of holes 931 and 932 on right side 805b. Left side 805a of upper portion includes a pair of holes 939 and 940 that are symmetrical in size and position with pair of holes 943 and 944 on right side 805b. Left side 805a of upper portion 805 includes holes 934 and 949 that are symmetrical in size and position with pair of holes 933 and 938 on right side 805b. Left side 805a of upper portion 805 includes a pair of holes 941 and 938 that are symmetrical in size and position with pair of holes 937 and 942 on right side 805b.

Left side 805a of upper portion 805 further includes a pair of spaced holes 966 and 967 that are symmetrical in size and position with pair of holes 960 and 961 on right side 805b. Left side 805a of upper portion includes a pair of holes 964 and 965 that are symmetrical in size and position with pair of holes 962 and 963 on right side 805b.

Figure 5F:
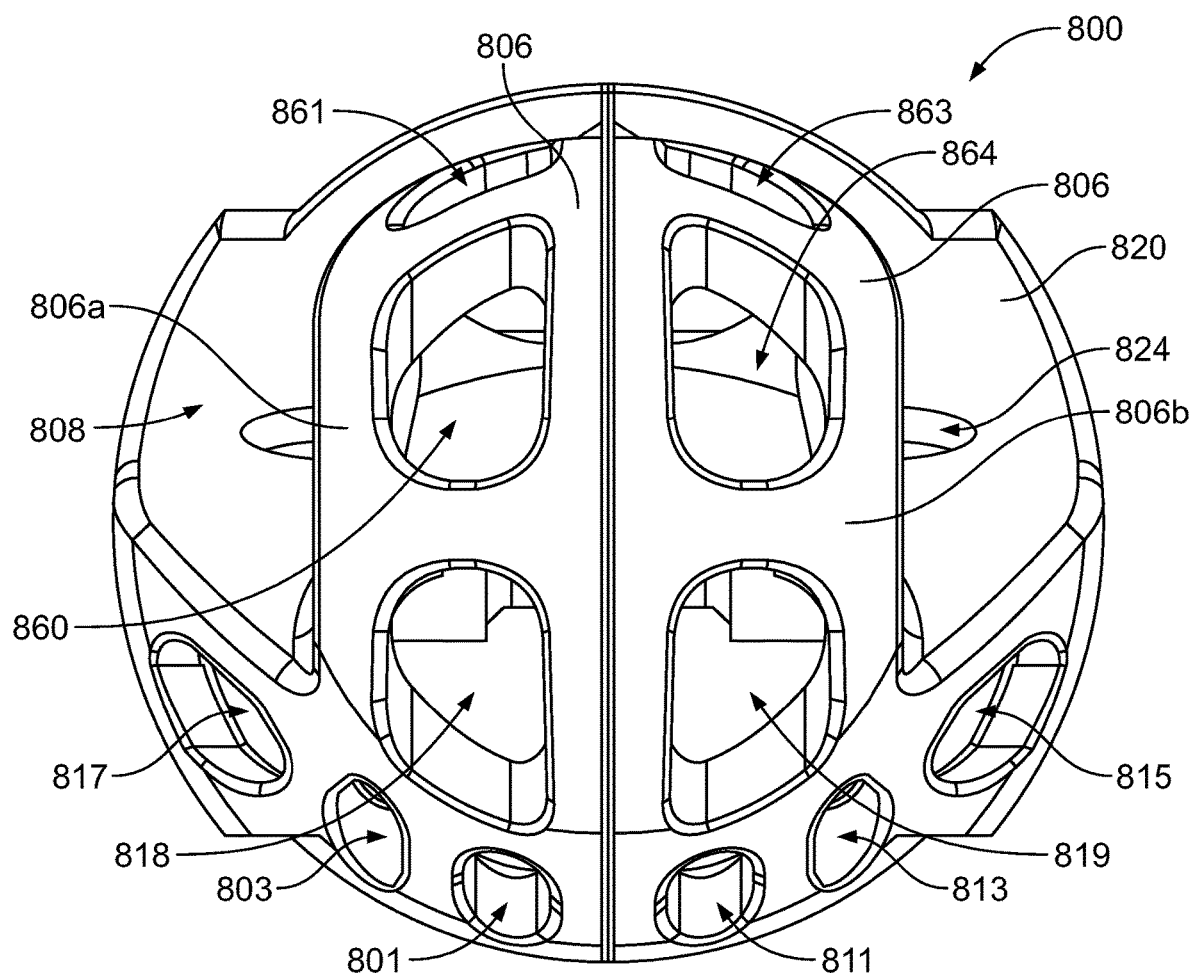
FIG. 5F is a top view of payload retriever 800 shown in FIGS. 5A-E.

FIG. 5F is a bottom view of payload coupling apparatus 800. Hole 861 is positioned on the left side 806a of bottom of lower hook or lip 806 that is symmetrical in size and position with hole 863 positioned on right side 806b. Left side 806a further includes hole 860 that is symmetrical in size and position with hole 864 on right side 806b. Left side 806a includes hole 818 that is symmetrical in size and position with hole 819 on right side 8060b.

Hole 824 is shown extending symmetrically from the left side to the right side of upper surface 820 of slot 808. Left side 806a includes hole 817 that is symmetrical in size and position with hole 815 on right side 806b. In addition, a pair of holes 801 and 803 are positioned on right side 806a that are symmetrical in size and position with pair of holes 811 and 813 positioned on right side 806b.

It will be appreciated that the size, position, geometry, and configuration of the various hole described above may be changed to different sizes, positions, geometries, and configurations. Preferably, although not required, holes positioned on the left side of the payload coupling apparatus 800 are symmetrical in size and position with the holes positioned on the right side of payload coupling apparatus 800.

Figure 6A:
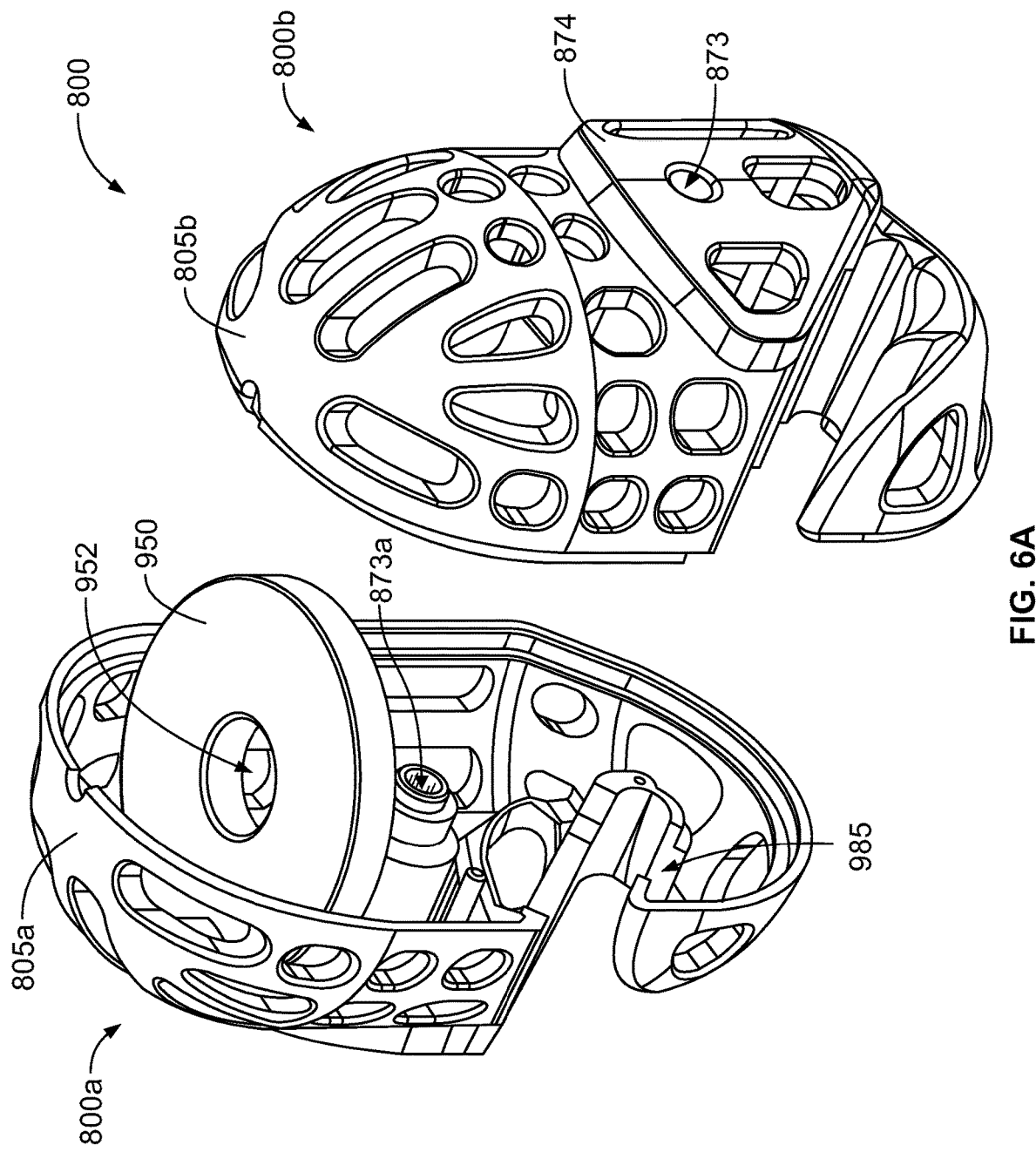
FIG. 6A is an exploded view of payload retriever 800 with left side 800a separated from right side 800b shown with disc insert 950, according to an example embodiment.
Figure 6B:
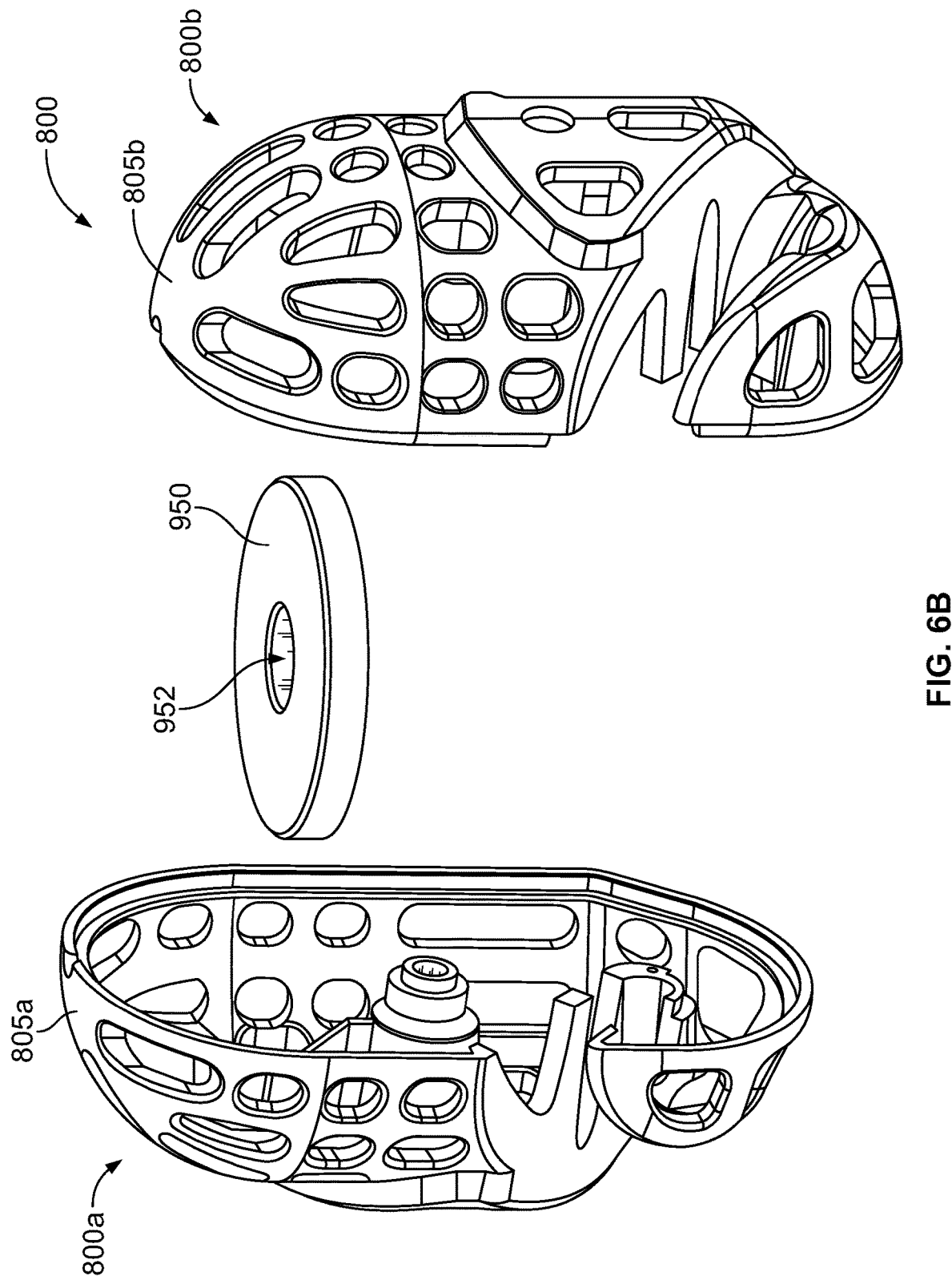
FIG. 6B is another exploded view of payload retriever 800 with left side 800a separated from right side 800b shown with disc insert 950, according to an example embodiment.

As shown in FIGS. 6A and 6B, payload coupling apparatus may be formed with a left side 800a and right side 800b. Left and right sides 800a and 800b may be molded, or 3D printed, and made of any suitable material. Left and right sides 800a and 800b may be joined together with an adhesive, or heat sealed together. A fastener such as a bolt may extend through hole 873 in right side 800b and thread into mounting extension 873*a* within left side 800*b*, which further serves to hold left side 800*a* together with right side 800*b*.

Figure 9B:
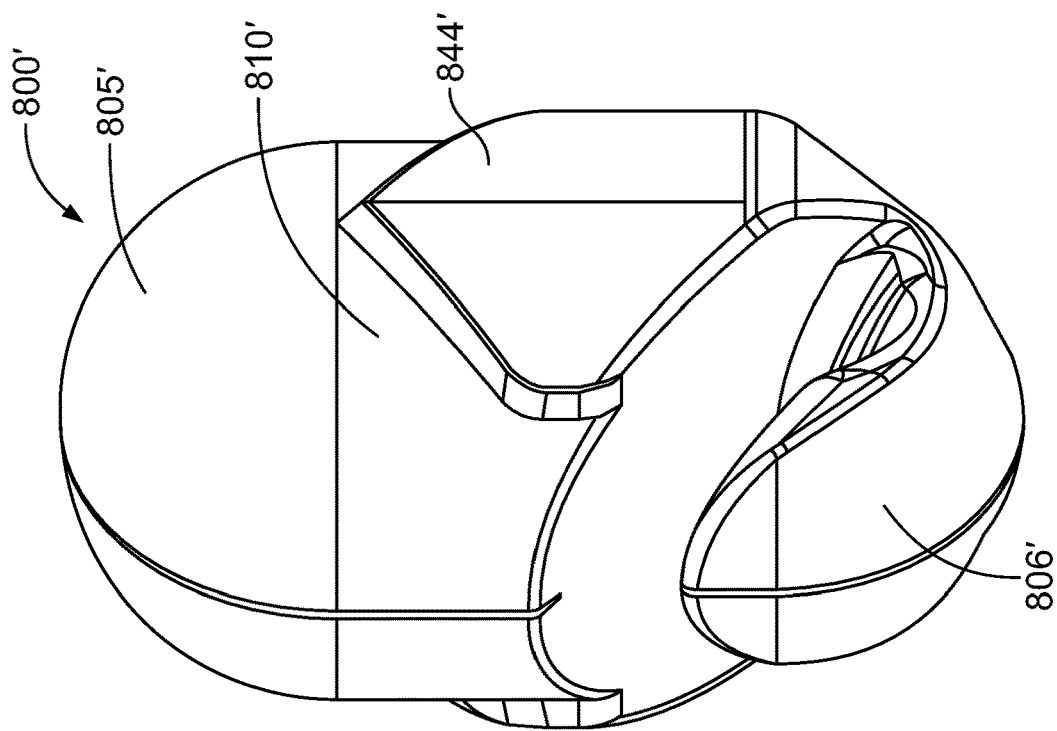
FIGS. 9A and 9B are a perspective side by side view of payload coupling apparatus 800 and payload coupling apparatus 800'.
Figure 9A:
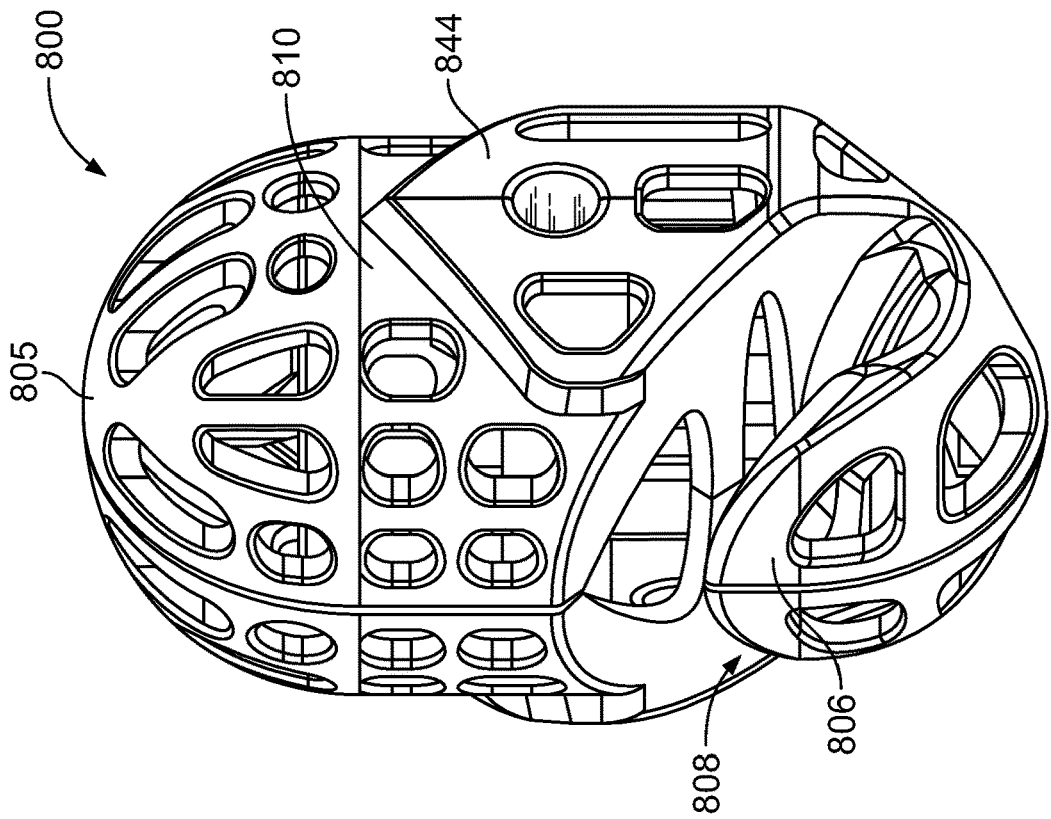

As shown in FIGS. 9A and 9B, because of the many holes in the surface of payload coupling apparatus 800, it is lighter than payload coupling apparatus 800' that has smooth walls and is without holes, but has the same size and configuration as payload coupling apparatus 800.

As shown in FIGS. 6A and 6B, a weighted disc 950 may be positioned within payload coupling apparatus 800. The weighted disc 950 may be slightly heavier than a weighted disc of a standard smooth-walled capsule to account for less material being used as a result of having the holes in payload coupling apparatus 800. In addition, weighted disc 950 may include a centrally located aperture 952. As the payload coupling apparatus 800 moves through the air during UAV flight and/or retraction, air may flow through upper portion 805, through aperture 952 and through the lower end of payload coupling apparatus 800. Air flow through the holes in payload coupling apparatus 800 provide stability to the payload coupling apparatus 800 during UAV flight and/or retraction. It will be appreciated that aperture 952 could be replaced with a plurality of holes on weighted disc 950 having various sizes and geometries, which may or may not be symmetrical with respect to each other.

FIG. 7 is a side view of payload handle 511 that is attached payload 510 (shown in FIGS. 8A-D), according to an example embodiment. The handle 511 includes aperture 513 through which the hook or lip 806 of a payload coupling apparatus 800 extends through to suspend the payload during delivery, or during retrieval. The handle 511 includes a lower portion 515 that is secured to the top portion of a payload. Also included are holes 524 and 526 through which are adapted to receive locking pins (not shown) positioned within the fuselage of a UAV, where the locking pins may extend to further secure the handle and payload in a secure position during high speed forward flight to a delivery location. The handle 511 may be comprised of a thin, flexible plastic material that is flexible and provides sufficient strength to suspend the payload beneath a UAV during forward flight to a delivery site, and during delivery and/or retrieval of a payload. In practice, the handle may be bent or flexed to secure the handle 511 within the slot 808 of the payload retriever 800. The handle 511 also has sufficient strength to withstand the torque during rotation of the payload retriever into the desired orientation within the payload receptacle, and rotation of the top portion of the payload into position within the recessed restraint slot 540 (shown in FIG. 8E).

FIG. 8A is a perspective view of payload 510 and payload coupling apparatus 800 shown suspended by tether 990 from a UAV, above payload landing site 980, according to an example embodiment. As payload 510 is lowered to the payload landing site 980, the payload is suspended from payload coupling apparatus 800, with hook or lip 806 extending through aperture 513 of handle 511 of payload 510.

FIG. 8B is a perspective view of payload 510 and payload coupling apparatus 800 being lowered by a UAV onto payload landing site 980. FIG. 8C is a perspective view of payload 510 positioned on payload landing site 980 after payload coupling apparatus 800 has been lowered and moved out of engagement with handle 511 of payload 510.

FIG. 8D is a perspective view of payload coupling apparatus 800 being retracted to UAV 100 after delivery of payload 510. FIG. 8E is a perspective view of payload coupling apparatus 800 being retracted towards payload coupling apparatus receptacle 516.

FIGS. 9A and 9B are a perspective side by side view of payload coupling apparatus 800 having a plurality of holes and payload coupling apparatus 800' having no holes and smooth walls. Payload coupling apparatus 800' includes a hemispherically-shaped upper portion 805', side wall 810', outer protrusion 844' and hook or lip 806'.

After delivering payload 510, as shown in FIG. 8D, the payload coupling apparatus 800 is disengaged from the handle 511 of payload 510, and the UAV 100 may move into forward flight to another payload retrieval site or charging station, with the payload coupling apparatus 800 suspended from the UAV at the end of the winch line 990. As the UAV 100 moves forward, the payload coupling apparatus 800 may be winched back towards the UAV 100 at the same time. In this manner, the UAV 100 does not have to wait until the payload coupling apparatus 800 has been winched all the way back to the UAV 100 before the UAV 100 moves towards the next destination.

As noted above, the payload coupling apparatus 800 is subject to oscillations, and may begin to swing from side to side as the UAV 100 moves into forward flight. In order to dampen the oscillations, the UAV 100 moves into a forward flight where airflow serves to reduce oscillations of the payload coupling apparatus 800. When using a solid, smooth-walled payload coupling apparatus 800' shown in FIG. 9B, forward movement of the UAV 100 at air speeds of around 20 meters per second (m/s) may be effective to dampen the oscillations of the payload coupling apparatus 800'. However, if the air speed is too low, less than 19 m/s, then dampening effect on the oscillations of the payload is reduced and might not be sufficient. In addition, at speeds above 22 m/s, the payload coupling apparatus 800' becomes unstable with the increased airflow and bounces around wildly and may strike the UAV, and there is the possibility of engagement with the rotors of the UAV. Therefore, when using a solid, smooth-walled payload coupling apparatus 800', only a narrow range of air speeds from 19-22 m/s are suitable to dampen the oscillations of the payload coupling apparatus. At air speeds in the range of 19-22 m/s, depending on the UAV, this speed may be too slow for the UAV to be "on the wing" in full forward flight requiring that the hover motors of the UAV are still running, which increases energy consumption and reduces the range of the UAV.

Payload coupling apparatus 800 has the same hook and lip construction as a standard smooth-walled payload coupling apparatus 800', but advantageously includes a series of perforations, or holes, in the major surfaces of the payload coupling apparatus 800, as described above, which allow the payload coupling apparatus 800 to remain stable even at increased air speeds of 25-35 m/s or more. The series of perforations or holes serve to stabilize the payload coupling apparatus 800 during retraction so that it remains in a stable state, without moving erratically (as is the case when using payload coupling apparatus 800') during high speed UAV flight of 25-35 m/s or more.

Wind tunnel testing has revealed that payload coupling apparatus 800 remains stable and does not move erratically or wildly at speeds of 25-35 m/s or more, whereas at that speed, payload coupling apparatus 800' swings about wildly and erratically, and is very unstable.

The symmetrically positioned holes extend through outer surfaces of the payload coupling apparatus 800 into a hollow interior of the payload coupling apparatus 800. As a result, air is allowed to flow through the payload coupling apparatus 800, i.e. through the holes on the hemispherically-shaped upper portion and through the holes in the upper and lower surfaces of the slot and hook or lip, during high speed flight, which allows for the payload coupling apparatus 800 to remain in a stable position during retraction as the UAV moves at full cruise speed of 25-35 m/s or more.

In addition, as shown in FIGS. 6A and 6B, a weighted disc 950 may be positioned within the payload coupling apparatus 800 to provide a "weight-forward" payload coupling apparatus 800 which contributes to increased high speed stability. Due to less material used for the payload coupling apparatus 800 as compared to payload coupling apparatus 800' because of the holes, the disc 950 may add additional weight to the payload coupling apparatus 800 as compared to the weighted disc used in smooth-walled payload coupling apparatus 800' (shown in FIG. 9B) so that a desired overall weight may be achieved that is the same as payload coupling apparatus 800'.

Furthermore, the weighted disc 950 may have a centrally located aperture 952 that provides an aerodynamic influence on the payload coupling apparatus 800. The size of the centrally located aperture 952 in the weighted disc may be adjusted so that the payload coupling apparatus 800 rides higher or lower in the air column during retraction as the UAV 100 moves at full cruise speed. Of course, one or more holes may also be positioned in weighted disc 950 which may or may not by symmetrical in terms of size or position. It is desirable for the payload coupling apparatus 800 to ride as low as possible in the air column so that it is further away from the UAV 100 during flight, thereby further reducing the chance of the payload coupling apparatus 800 coming into contact with the UAV 100 during flight.

The air flow around (or through) the payload coupling apparatus 800 is believed to actually be more turbulent than around smooth-walled payload coupling apparatus 800'. The difference is that the turbulence on the payload coupling apparatus 800 is very uniform (lots of very small and weak vortices) in comparison to the turbulence around the smooth-walled payload coupling apparatus 800'at higher speeds is random (with big and strong vortices). The uniformity of the turbulence is what helps to achieve the stable behavior in payload coupling apparatus 800. In addition, further stability is also provided by having airflow that enters the payload coupling apparatus 800 in the front (through holes in upper portion 805) partially redirected outward to the holes in side wall 810. The air exiting the holes of the side wall creates an air cushion which makes the payload coupling apparatus behave like a "shuttlecock," resulting in greater stability during flight.

Using payload coupling apparatus 800 provides significant advantages in comparison to payload coupling apparatus 800'. In particular, because the plurality of holes in payload coupling apparatus 800 provides for a stable payload coupling apparatus at speeds of 25-35 m/s or more, once payload coupling apparatus 800 is disengaged from a payload at a payload delivery site, the UAV may immediately move into full forward flight of 25-35 m/s or more. The payload coupling apparatus 800 may be retracted towards the UAV at the same time. As a result, the UAV does not have to fly at a reduced speed of 19-22 m/s (as is the case when using payload coupling apparatus 800') to have a stable payload coupling apparatus, and the hover motors are not needed. Because the hover motors can be turned off during retraction, less power is required and the overall safety is increased in the very unlikely event (because of the stability of payload coupling apparatus 800) of contact between payload coupling apparatus 800 and hover props (e.g., due to a sudden air turbulence in cruise flight), there would be no damage to the hover propellers because they would not be rotating. In addition, less time is required following payload delivery as the payload coupling apparatus 800 is retracted because the UAV is able to move directly into full speed flight of 25-35 m/s or more.

Furthermore, during winch up of a payload 510 to the UAV 100, high winds may cause the payload 510 and payload coupling apparatus 800 to rotate. Once the payload coupling apparatus 800 reaches the UAV, it is drawn into a payload receptacle and cams within the payload receptacle engage with cams on the payload coupling apparatus to align the payload in a desired position. The engagement of the cams arrests the rotation of the payload coupling apparatus 800 and may cause the handle 511 of payload 510 to "spin itself out" of the slot in the payload coupling apparatus as payload 510 continues to rotate. In order to prevent the handle 511 from coming out of the slot under such conditions, as shown in FIGS. 4A-C, a first indentation 650 is positioned on a left side of slot 808 in left side 806a of hook or lip 806 and a second indentation 652 is positioned on a right side of the slot 808 in right side 806b of hook or lip 806. First indentation 650 and second indentation 652 arrest rotation of the handle 511 as the handle 511 gets caught in the indentations. Indentations 650 and 652 serve to prevent the handle 511 from "spinning itself out" of the slot 808 during rotation of payload 510 caused by high winds during winch up. First and second indentations 650 and 652 may also be provided on smooth-walled payload coupling apparatus 800' shown in FIG. 9B.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:
1. A payload coupling apparatus comprising:
  a housing having an upper portion, a lower portion, and a side wall positioned between the upper and lower portions;
  an attachment point on the housing adapted for attachment to a first end of a tether;
  a slot in the housing that extends downwardly towards a center of the housing thereby forming a hook or lip on the lower portion of the housing beneath the slot;
  a plurality of holes in the upper portion of the housing; and
  a plurality of holes in the lower portion of the housing;

wherein the housing is hollow, and air is allowed to flow through the plurality of holes in the upper portion of the housing, through the housing, and exit the plurality holes in the lower portion of the housing; and wherein the housing is constructed with two pieces.

2. The payload coupling apparatus of claim 1, wherein a plurality of holes are positioned in the side wall of the housing.

3. The payload coupling apparatus of claim 2, wherein a first cam and a second can extend outwardly from opposite sides of the side wall, and wherein a plurality of holes are positioned on the first cam and on the second cam.

4. The payload coupling apparatus of claim 3, wherein a first indentation is positioned on a right side of the slot and a second indentation is positioned on a left side of the slot, and the first and second indentations and first and second cams are adapted to prevent a handle of a payload from coming out of the slot during possible rotation of the payload caused by high winds during winch up.

5. The payload coupling apparatus of claim 2, wherein air is partially directed through the holes in the side wall during retraction of the housing.

6. The payload coupling apparatus of claim 2, wherein when the first end of the tether is attached to the attachment point on the housing, the housing remains stable when the housing is retracted through an air flow of 25-35 m/s.

7. The payload coupling apparatus of claim 2, wherein the side wall has a diameter D, and wherein when the first end of the tether is attached to the attachment point on the housing, the housing has a centerline that remains within a distance of 2D to 3D of centerline of the housing when the housing is retracted through an air flow of 25-35 m/s.

8. The payload coupling apparatus of claim 1, wherein the plurality of holes on the lower portion of the housing extend through a bottom surface of the hook or lip.

9. The payload coupling apparatus f claim 8, wherein one or more holes extend through a top surface of the hook or lip.

10. The payload coupling apparatus of claim 9, wherein one or more holes extend through an upper surface of the slot.

11. The payload coupling apparatus of claim 1, wherein the two pieces of the housing include a right side and a left side.

12. The payload coupling apparatus of claim 11, wherein the two pieces of the housing are secured to each other using a fastener that extends through one of the left side or right side of the housing and is threaded into a mounting extension positioned on an interior of the other of the left side or right side of the housing.

13. The payload coupling apparatus of claim 1, wherein the upper portion of the housing has a hemispherical shape.

14. The payload coupling apparatus of claim 1, wherein the plurality of holes on a left side of the lower portion of the housing are positioned symmetrically with the plurality of holes on a right side of the lower portion of the housing.

15. The payload coupling apparatus of claim 1, wherein a weighted disc is positioned within the housing.

16. The payload coupling apparatus of claim 15, wherein one or more holes are positioned in the weighted disc.

17. The payload coupling apparatus of claim 16, wherein the housing is hollow, and air is allowed to flow through the plurality of holes in the upper portion of the housing, through the one or more holes in the weighted disc, through the housing, and exit the plurality holes in the lower portion of the housing.

18. The payload coupling apparatus of claim 15, wherein the weighted disc includes a centrally located aperture.

19. A method of retracting a payload coupling apparatus to a UAV comprising:

providing the payload coupling apparatus with a housing having an upper portion and a lower portion, and a side wall positioned between the upper portion and the lower portion, the housing attached to a first end of a tether with a second end of the tether attached to the UAV, a slot in the housing that extends downwardly towards a center of the housing thereby forming a hook or lip on the lower portion of the housing beneath the slot, a plurality of holes in the upper portion of the housing, a plurality of holes in the side wall of the housing, and a plurality of holes positioned in the lower portion of the housing, wherein the housing is hollow, and air is allowed to flow through the plurality of holes in the upper portion of the housing, through the housing, and exit the plurality holes in the lower portion of the housing, and wherein the housing is constructed with two pieces;

moving the UAV forward at a rate of 25-35 m/s;

retracting the payload coupling apparatus towards the UAV with the tether as the UAV moves forward at a rate of 25-35 m/s;

wherein the payload coupling apparatus remains stable during retraction of the payload coupling apparatus.

20. The payload method of claim 19, wherein the two pieces of the housing are secured to each other using a fastener that extends through one of a left side or a right side of the housing and is threaded into a mounting extension positioned on an interior of the other of the left side or right side of the housing.

21. The method of claim 19, wherein the plurality of holes on the lower portion of the housing extend through a bottom surface of the hook or lip;

wherein a plurality of holes extend through a top surface of the hook or lip; and wherein a plurality of holes extend through an upper surface of the slot.

22. The method of claim 19, wherein a weighted disc is positioned within the housing;

wherein the weighted disc includes one or more holes; and wherein the housing is hollow, and air is allowed to flow through the plurality of holes in the upper portion of the housing, through the one or more holes in the weighted disc, through the housing, and exit the plurality holes in the lower portion of the housing.

23. The method of claim 19, wherein a first Cam and a second cam extend outwardly from opposite sides of the side wall; and wherein a first indentation is positioned on a right side of the slot and a second indentation is positioned on a left side of the slot, and the first and second indentations and first and second cams are adapted to prevent a handle of a payload from coming out of the slot during possible rotation of the payload caused by high winds during winch up.

* * * * *